(12) United States Patent
Nof et al.

(10) Patent No.: US 9,166,907 B2
(45) Date of Patent: Oct. 20, 2015

(54) FAILURE REPAIR SEQUENCE GENERATION FOR NODAL NETWORK

(71) Applicant: PURDUE RESEARCH FOUNDATION, West Lafayette, IN (US)

(72) Inventors: Shimon Y. Nof, Lafayette, IN (US); Xin Chen, Glen Carbon, IL (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 123 days.

(21) Appl. No.: 14/157,193

(22) Filed: Jan. 16, 2014

(65) Prior Publication Data

US 2014/0198630 A1 Jul. 17, 2014

Related U.S. Application Data

(60) Provisional application No. 61/753,912, filed on Jan. 17, 2013.

(51) Int. Cl.
*H04L 12/50* (2006.01)
*H04L 12/703* (2013.01)
*H04L 12/753* (2013.01)

(52) U.S. Cl.
CPC .............. *H04L 45/28* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 6,850,511 B2 | 2/2005 | Kats et al. | |
| 6,981,039 B2 * | 12/2005 | Cerami et al. | 709/223 |
| 7,568,133 B1 | 7/2009 | Bette et al. | |
| 7,570,580 B1 * | 8/2009 | Bajpay et al. | 370/216 |
| 7,716,527 B2 | 5/2010 | Drouet et al. | |
| 7,808,890 B2 * | 10/2010 | Shand et al. | 370/217 |
| 7,965,622 B2 | 6/2011 | Bajpay et al. | |
| 8,095,614 B2 | 1/2012 | Hopkins | |
| 2011/0054709 A1 | 3/2011 | Son | |

OTHER PUBLICATIONS

LaCommare, K. H. and Eto, J. H., 2004, "Understanding the Cost of Power Interruptions to U.S. Electricity Consumers", Energy Analysis Department, Ernest Orlando Lawrence Berkeley National Laboratory, University of California Berkeley, Berkeley, California 94720.
Ang, C. C., 2006, "Optimized Recovery of Damaged Electrical Power Grids", M.S. Thesis, Naval Postgraduate School, Monterey, California, USA.
Dorogovtsev, S. N., Mendes, J. F. F., and Samukhin, A. N., 2001, "Giant strongly connected component of directed networks," Physical Review E—Statistical, Nonlinear, and Soft Matter Physics, 64(2), pp. 025101I-025101I4.
Watts, D. J. and Strogatz, S. H., 1998, "Collective dynamics of 'small-world' networks," Nature, 393, pp. 440-442.

(Continued)

*Primary Examiner* — Ian N Moore
*Assistant Examiner* — Lakeram Jangbahadur
(74) *Attorney, Agent, or Firm* — Rossi, Kimms & McDowell LLP

(57) ABSTRACT

Failure repair sequence generation systems and methods may generate a repair sequence for nodes experiencing failure in a nodal-network-based system that meets acceptable performance metrics, such as acceptable total network damage, acceptable node-failure preventability rate, or a combination thereof.

8 Claims, 13 Drawing Sheets

(56) References Cited

OTHER PUBLICATIONS

Angeles Serrano, M. and De Los Rios, P., 2007, "Interfaces and the edge percolation map of random directed networks," Physical Review E-Statistical, Nonlinear, and Soft Matter Physics, 76(5), pp. 56-121.
Barabasi, A. L. and Albert, R., 1999, "Emergence of scaling in random networks," Science, 286(5439), pp. 509-512.
Chen, X. W. and Nof, S. Y., 2007, "Prognostics and diagnostics of conflicts and errors over e-Work networks," in Proc. of the 19th International Conference on Production Research, Chile.
Chen, X. W., 2009, "Prognostics and Diagnostics of Conflicts and Errors with Prevention and Detection Logic", Ph.D. Dissertation, Purdue University, West Lafayette, Indiana, USA.
Chen, X. W. and Nof, S. Y., 2010, "A decentralized conflict and error detection and prediction model," International Journal of Production Research, 48(16), pp. 4829-4843.
Chen, X. W. and Nof, S. Y., 2012, "Conflict and error prevention and detection in complex networks," Automatica, 48, pp. 770-778.
Dawande, M., Mookerjeeh, V., Sriskandarajah, C., Zhu, Y., 2011, "Structural search and optimization in social networks," INFORMS Journal on Computing.
Dimitrov, B., Chukova, S., and Khalil, Z., 2004, "Warranty costs: An age-dependent failure/repair model," Naval Research Logistics, 51(7), pp. 959-976.
FICO, 2011, Insurance Fraud Manager, Health Care Edition, http://www.fico.com/en/Products/DMApps/Pages/FICO-Insurance-Fraud-Manageraspx, accessed in Oct. 2012.
Goldsman, D. and Nelson, B. L., 1998, "Comparing systems via simulation," In Handbook of Simulation, ed. J. Banks, pp. 273-306. New York: John Wiley.
Jeong, H., 2003. "Complex scale-free networks", Physica A: Statistical Mechanics and Its Applications, 321, 226-237.
Kim, S.-H. and Nelson, B. L., 2005, "Selecting the best system," In Handbooks in Operations Research and Management Science, pp. 501-534. Elsevier, Oxford, UK.
Salmeron, J., Wood, K, and Baldick, R., 2004, "Analysis of electric grid security under terrorist threat," IEEE Transactions on Power Systems, 19(2), pp. 905-912.
Sim, S. H. and Endrenyi, J., 1993, "Failure-repair model with minimal and major maintenance," IEEE Transactions on Reliability, 42(1), pp. 134-140.
EPRI, 2012, Power Delivery and Utilization Research, http://portfolio.epri.com/Sector.aspx?sId=PDU, accessed in Oct. 2012.
Anand, A., 2008, "A data mining framework for identifying claim overpayments for the health insurance industry," in Proc. of the 3rd INFORMS Workshop on Data Mining and Health Informatics.
Barabasi, A.L., 2002. The New Science of Networks. Cambridge, Massachusetts: Perseus Publishing. Basic Books. pp. 9-11 and 69-72.

\* cited by examiner

A fault network comprised of two disconnected components. Each component has one root node.

A fault network comprised of two disconnected components. Each component has one leaf node.

FAILURE REPAIR SEQUENCE GENERATION FOR NODAL NETWORK

TECHNICAL FIELD

At least some embodiments of this invention pertain to generating a repair sequence for nodes in a nodal network that are experiencing failure.

BACKGROUND

Faults (or failures) are unavoidable in complex systems such as supply chains, power grids, and healthcare systems. Faults have major cost implications and can cause catastrophic events. For instance, the annual cost of power interruptions in the U.S. is estimated between $22 and $135 billion. See LaCommare, K. H. and Eto, J. H., 2004, *Understanding the Cost of Power Interruptions to U.S. Electricity Consumers*, Energy Analysis Department, Ernest Orlando Lawrence Berkeley National Laboratory, University of California Berkeley, Berkeley, Calif. 94720. A healthcare insurance company covering 10 million members is estimated to pay $400 million a year in overpayments due to unintentional (mistakes made by patients, providers, and insurance companies) and intentional errors (fraudulent claims). See Anand, A., 2008, "A data mining framework for identifying claim overpayments for the health insurance industry," in *Proc. of the 3rd INFORMS Workshop on Data Mining and Health Informatics*.

Most faults in a system are caused by a few faulty sources which require repair. These faulty sources can cause other downstream faults to subsystems that are dependent upon the faulty sources. Accordingly, these downstream faults are repaired once the faulty sources are repaired. For instance, products flow from supplier A downstream to customer B in a supply chain. A fault occurs if B does not receive certain products by a predetermined time. The fault at B, however, often is caused by faults at A or faults at other manufacturing or distribution entities along the path from A to B. The fault at B, therefore, is repaired after any fault at A and the other faulty entities are repaired. Similarly, a fault occurs in an electrical power grid if a bus (transmission path) cannot provide electricity to a customer. If the bus itself is damaged, and has, consequently, caused damage to downstream electrical components, the bus is repaired before repairing the damaged downstream electrical components.

Although the issue of how to prevent and repair failures (or faults) with an optimal sequence is an important issue in the art, it, conventionally, has largely been left open. See Ang, C. C., 2006, *Optimized Recovery of Damaged Electrical Power Grids*, M. S. Thesis, Naval Postgraduate School, Monterey, Calif., USA. Accordingly, a need in the art exists for techniques to generate improved failure (or fault) prevention and repair ("FPR") sequences.

SUMMARY

The above-described need is addressed and a technical solution is achieved in the art by failure repair sequence generation systems and methods according to various embodiments of the present invention.

According to some embodiments, a failure repair sequence generation system includes a data processing device system and a memory device system communicatively connected to the data processing device system. The memory device system may store a program executable by the data processing device system, as well as network information indicating at least a network topology including a plurality of nodes. The plurality of nodes may include a plurality of root nodes and a plurality of leaf nodes, each leaf node may be connected directly or indirectly to at least one root node of the plurality of root nodes. A subset of the plurality of root nodes may be indicated by the network information as experiencing or about to experience failure, and a subset of the plurality of leaf nodes may be indicated by the network information as experiencing or about to experience failure.

The data processing device system may be configured by the program at least to acquire, from the memory device system, the network information; generate a failure repair sequence based at least upon an analysis of at least a portion of the network information; and store the generated failure repair sequence in the memory device system. The failure repair sequence may indicate a sequence of node sets in which the node sets should be repaired. Each node set may include a node of the plurality of nodes.

The analysis may include one or both of at least two sub-analyses. The first sub-analysis may include identifying a damage-priority-repair root node of the subset of the plurality of root nodes indicated as experiencing failure that has a greatest number of leaf nodes of the subset of the plurality of leaf nodes indicated as experiencing failure as compared to at least some other root nodes of the subset of the plurality of root nodes besides the damage-priority-repair root node. The first sub-analysis may also include assigning the identified damage-priority-repair root node a damage-priority-repair position in the sequence as compared to the at least some other root nodes of the subset of the plurality of root nodes besides the damage-priority-repair root node. The damage-priority-repair position may be a position in the sequence that indicates that the identified damage-priority-repair root node should be repaired with a higher priority than the at least some other root nodes of the subset of the plurality of root nodes besides the damage-priority-repair root node. In this regard, the first sub-analysis may be suitable for minimizing or otherwise reducing damage caused by node failures.

The second sub-analysis may include identifying a preventability-priority-repair root node of the subset of the plurality of root nodes indicated as experiencing or about to experience failure that has a connected leaf node of the plurality of leaf nodes that (i) is not indicated as experiencing failure and (ii) is connected to a fewest number of root nodes as compared to at least some other leaf nodes of the plurality of leaf nodes not indicated as experiencing or about to experience failure. The second sub-analysis may also include assigning the identified preventability-priority-repair root node a preventability-priority-repair position in the sequence as compared to at least some other root nodes of the subset of the plurality of root nodes besides the preventability-priority-repair root node. The preventability-priority-repair position may be a position in the sequence that indicates that the identified preventability-priority-repair root node should be repaired with a higher priority than the at least some other root nodes of the subset of the plurality of root nodes besides the preventability-priority-repair root node. In this regard, the second sub-analysis may be suitable for maximizing or otherwise improving the preventability of future failures.

In some embodiments, the memory device system stores repair resource information indicating at least resources available for node repair. In this regard, the data processing device system may be further configured by the program at least to generate a plurality of failure repair sequences including the generated failure repair sequence; and generate a lower-bound-performance sequence based at least upon an analysis of the network information. The lower-bound-performance sequence may represent a repair sequence having a repair duration defined as a lower-bound threshold. The data processing device system may be further configured by the program at least to generate an upper-bound-performance sequence based at least upon an analysis of the network information. The upper-bound-performance sequence may represent a repair sequence having a repair duration shorter than the repair duration of the repair sequence represented by the lower-bound-performance sequence and defined as an upper-bound threshold.

Further in this regard, the data processing device system may be configured by the program at least to determine a performance for each of the plurality of generated failure repair sequences based at least upon an analysis of the repair resource information with respect to the respective generated failure repair sequence. The data processing device system may be configured by the program at least to determine whether each of the plurality of generated failure repair sequences has acceptable performance or unacceptable performance based at least upon an analysis of the determined performance of the respective generated failure repair sequence and the upper-bound threshold and the lower-bound threshold. And, the data processing device system may be configured by the program at least to record in the memory device system at least one or more changes at least in response to the determining of one or more of the generated failure repair sequences as having unacceptable performance.

In some embodiments, the data processing device system may be configured by the program at least to determine whether to perform the first sub-analysis, the second sub-analysis, or both the first sub-analysis and the second sub-analysis based at least upon a preliminary analysis of the network topology indicated by the network information. In this regard, some network topologies may be better suited for the first sub-analysis, the second sub-analysis, or a combination of the first sub-analysis and the second sub-analysis.

In this regard, the network topology may include low-level internal nodes, each directly connected to at least one leaf node of the plurality of leaf nodes, and the preliminary analysis may be configured to lead to a determination of performing the second sub-analysis in response to a determination that each of the low-level internal nodes is directly connected to a same or substantially a same number of leaf nodes as compared to others of the low-level internal nodes. On the other hand, the preliminary analysis may be configured to lead to a determination of performing the first sub-analysis in response to a determination that each of the plurality of leaf nodes is connected to a same or substantially a same number of different root nodes as compared to others of the leaf nodes.

In some embodiments, the data processing device system is configured by the program at least to perform the first sub-analysis followed by the second sub-analysis or vice versa. For example, the data processing device system is configured by the program at least to generate at least a portion of the failure repair sequence at least by preliminarily generating a first sequence based at least upon repeatedly performing the second sub-analysis. The first sequence may include a sequence of groups of nodes indicating an order in which the groups of nodes should be repaired. In addition, the data processing device system may be configured by the program at least to generate at least a portion of the failure repair sequence at least by generating an intra-group sequence for each of the plurality of groups of root nodes based at least upon repeatedly performing the first sub-analysis. Each intra-group sequence may be a sequence of root nodes indicating an order in which the root nodes in each respective group should be repaired. The failure repair sequence may represent at least the sequence of groups of root nodes of the first sequence with each group having its respective intra-group sequence of root nodes.

In some embodiments, the data processing device system is configured by the program at least to generate at least a portion of the failure repair sequence at least by identifying, based at least upon performance of at least a portion of the first sub-analysis, at least two root nodes having a same greatest number of leaf nodes of the subset of the plurality of leaf nodes indicated as experiencing or about to experience failure as compared to at least some other root nodes of the subset of the plurality of root nodes besides the at least two root nodes. The at least two root nodes may be considered to form a group of root nodes. In addition, the data processing device system may be configured by the program at least to generate an intra-group sequence for the group of root nodes based at least upon performing at least a portion of the second sub-analysis. The intra-group sequence may be a sequence of the at least two root nodes indicating an order in which the at least two root nodes should be repaired. In this regard, the failure repair sequence may represent at least the intra-group sequence.

According to some embodiments, the memory device system stores repair resource information indicating at least resources available for node repair, and the data processing device system is further configured by the program at least to: receive an indication of acceptable repair performance; and generate the failure repair sequence to meet the acceptable repair performance while minimizing or otherwise reducing use of the resources available for node repair.

In some embodiments, the program comprises instructions configured to cause a data processing device system to perform according to any of the configurations described above in this Summary or otherwise herein. In some embodiments, the program is stored by a non-transitory computer-readable storage medium system including one or more non-transitory computer-readable storage mediums and is executable by one or more data processing devices of a data processing device system.

In addition, the above-described configurations or any other configuration or activity described herein may be executed as part of one or more failure repair sequence generation methods.

Various systems and various methods may include combinations and subsets of all those summarized above.

In addition to the embodiments described above, further embodiments will become apparent by reference to the drawings and by study of the following detailed description.

BRIEF DESCRIPTION OF THE DRAWINGS

The present invention will be more readily understood from the detailed description of preferred embodiments presented below considered in conjunction with the attached drawings, of which:

FIG. 9(*b*) illustrates a fault network of seven faulty nodes in the system network depicted in FIG. 9(*a*), according to some embodiments of the present invention;

FIG. 9(*c*) illustrates that each node in a nodal network may be considered a root node, an internal node, or a leaf node, according to some embodiments of the present invention;

Figure 1:
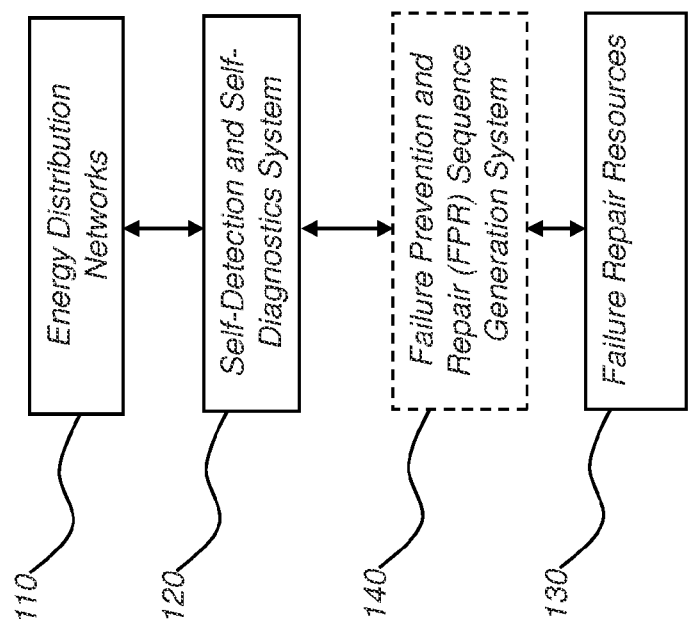
FIG. 1 illustrates a failure prevention and repair ("FPR") system according to some embodiments of the present invention.

It is to be understood that the attached drawings are for purposes of illustrating the concepts of the invention and may not be to scale.

DETAILED DESCRIPTION

Embodiments of the present invention pertain to analyzing a nodal network including faults and, based at least upon results of such analyzing, generating a failure (also referred to herein as a fault) repair sequence indicating an order in which faults in the nodal network should be repaired. The failure repair sequence may be generated to optimize or otherwise give priority to any number of parameters, which may be user-defined.

For example, one such parameter might be a total amount of damage experienced by the network due to the period during which one or more faults exist in the network. In this case, some embodiments of the present invention pertain to generating a failure repair sequence that optimizes or gives priority to minimizing or relatively reducing this total amount of damage.

For another example, one such parameter might be a number of downstream nodes in the network that are not presently experiencing failure, but have a likelihood or other probability of experiencing failure due to failure of one or more upstream nodes. In this case, some embodiments of the present invention pertain to generating a failure repair sequence that optimizes or gives priority to maximizing or relatively increasing the prevention of failure of such downstream nodes not presently experiencing failure, e.g., by minimizing or relatively reducing the number of such downstream nodes.

For yet another example, some embodiments of the present invention pertain to generating the failure repair sequence to optimize or otherwise give priority to multiple parameters. For example, some embodiments pertain to generating the failure repair sequence to optimize or otherwise give priority to both maximizing or relatively increasing the prevention of failure of downstream nodes not presently experiencing failure and minimizing or relatively reducing the total amount of damage experienced by the network due to the period during which one or more faults exist in the network. In some embodiments, the priority of one parameter may be higher than that of another parameter. For example, maximizing or relatively increasing the prevention of failure of downstream nodes not presently experiencing failure may be given priority over minimizing or relatively reducing the total amount of damage, or vice versa.

The nodal network may represent any system or workflow that may be represented by a node-based network including, but not limited to, a tree data structure, known in the art. Insurance claim processes or workflows, supply chains, power grids, computer networks, social networks, transportation networks, and healthcare systems are just a few examples. In a power grid, for example, generators, transmission lines, transformers, customer sites (e.g., houses or buildings), etc., could respectively represent nodes in a nodal network. In a computer system, for another example, computers, routers, servers, data communication lines, etc., could respectively represent nodes in a nodal network. For yet another example, in a process or workflow, each node could represent a task in such process or workflow. Accordingly, it can be seen that the present invention is not limited to any particular nodal network.

In this regard, nodes in a complex system may, in some various embodiments, represent machines, equipment, workstations, computers, generators, control units, and other components, each of which is modeled as a separate entity. Links between nodes, in some embodiments, may represent the flow of products, services, or information. Nodes may be linked directly or indirectly. If a node j is linked to a node j' directly, it may be said that there is an arc (i.e., a line with an arrow) or an edge (i.e., a line with no arrows) between the two nodes. When two nodes j and j' are linked indirectly, it may be said that there is at least one path between j and j' through other nodes so that products, services, or information may be transmitted from j to j', from j' to j, or both j to j' and j' to j. When two nodes are not linked, there is no path between the two nodes. Arcs may be considered directed links and edges may be considered undirected links. It may be said that a fault network is a network of faulty nodes in a system. For a given system, in some embodiments, any fault network is a subset of the system network. A system network may be considered the network that describes the system. In a fault network, it may be considered that an edge between two nodes j and j' indicates that a fault at j causes a fault at j' and vice versa; an arc from j to j' indicates that a fault at j causes a fault at j'.

Figure 9:
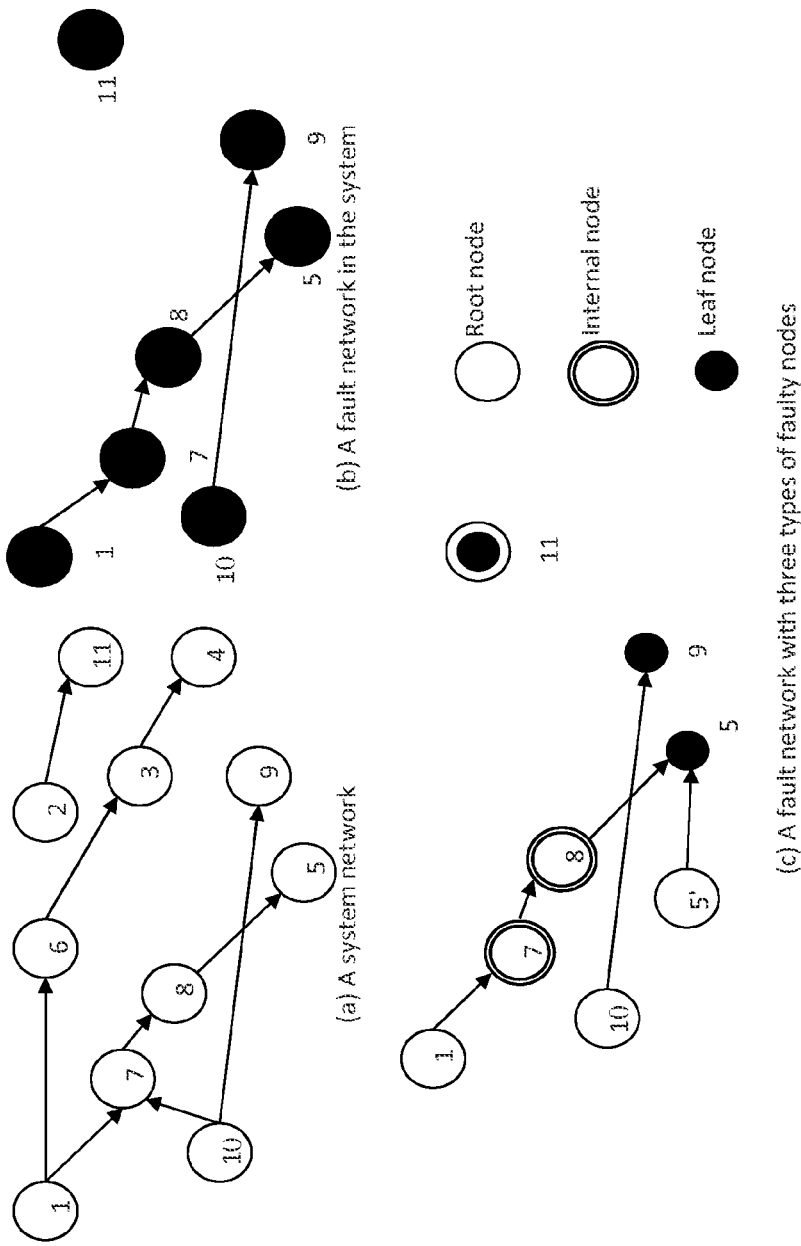
FIG. 9(*a*) illustrates a system-level nodal network ("system network"), according to some embodiments of the present invention.

FIG. 9(*a*) depicts a system-level nodal network ("system network") with 11 nodes. Arcs in the network may represent, for example, flows of product, service, or information in the system. FIG. 9(*b*) depicts a fault network of seven faulty nodes in the system network depicted in FIG. 9(*a*). FIG. 9(*c*) illustrates that each node in a nodal network may be considered a root node, an internal node, or a leaf node.

The number of arcs a faulty node has may be considered the degree of the node. See Dorogovtsev, S. N., Mendes, J. F. F., and Samukhin, A. N., 2001, "Giant strongly connected component of directed networks," *Physical Review E—Statistical, Nonlinear, and Soft Matter Physics,* 64(2), pp. 0251011- 0251014. The IN degree, $\delta^{IN}$, of a faulty node may be considered the number of arcs that point at the node. The OUT degree, $\delta^{OUT}$, of a faulty node may be considered the number of arcs that originate from the node.

In this regard, faulty nodes in a fault network (as opposed to a system network) may be considered to belong to three groups: leaf, internal, and root nodes. See FIG. 9(c). A faulty node j is (a) a root node if its fault is not caused by fault(s) at any other faulty node, i.e., $\delta_j^{IN}=0$; (b) a leaf node if it does not cause fault(s) at any other faulty node, i.e., $\delta_j^{OUT}=0$; (c) an internal node when $\delta_j^{IN}>0$ and $\delta_j^{OUT}>0$. A faulty node j is both a root and a leaf node if $\delta_j^{IN}=\delta_j^{OUT}=0$; this node is also called an orphan node because it is not connected to any other nodes. See, e.g., faulty node 11 in FIGS. 9(b) and 9(c). In some embodiments, it is considered that a root node requires repair, and an internal or a leaf node is repaired or prevented (from having a failure) if and only if all its causes are repaired or prevented. In FIG. 9(b), nodes 1, 10, and 11 are root nodes and require repair; nodes 7 and 8 are internal nodes; and nodes 5, 9, and 11 are leaf nodes. In some embodiments, it is considered that the total cost of failure prevention and repair ("FPR") of a fault network (e.g., FIG. 9(b)) includes repair cost and damage caused by faulty nodes. In some embodiments, it is considered that repair cost incurs for all root nodes. In some embodiments, it is considered that all faulty nodes could cause damage to customers, end-users, environment, or other value points of the system through leaf nodes. For instance, a bus in an electric power grid that directly supplies electricity to households may be considered a leaf node; a fault at the node causes damage to the households. In FIG. 9(b), for example, damage caused by all faulty nodes 1, 5, 7, 8, 9, 10, and 11 may be calculated at leaf nodes 5, 9, and 11, which form an interface between the system and its customers, end-users, environment, or other value points.

Faults at some internal and leaf nodes are partly caused by faults at other faulty nodes and partly due to faults that occur locally. Suppose the fault at node 5 in FIG. 9(b) is partly caused by node 8 and partly due to a fault that occurs locally. FIG. 9(b) does not show that node 5 also requires repair. However, FIG. 9(c) clarifies such repair requirements by incorporating a pseudo node 5' for node 5. Node 5', which is a root node and requires repair, does not exist in the original system network of FIG. 9(a), but is generated to reflect the internal repair requirement for node 5. There are four root nodes (1, 10, 11, and 5'), two internal nodes (7 and 8), and three leaf nodes (5, 9, and 11) in FIG. 9(c). As discussed above, node 11 is both a root and leaf node (e.g. is an orphan node). Many systems known in the art, such as smart grid, have self-detection and self-diagnostics ability, which provides necessary and sufficient information to help identify fault networks, including root nodes about to experience failure, and assemble the information shown in FIG. 9.

For a further description of how a nodal network may be defined, consider that three networks may be defined. Let $G(W,Ł)$ represent a complex system where W is the set of nodes (vertices) and Ł is the set of links in the system. |W| is the total number of nodes in W. |W| is an integer and |W|>0. Since faulty nodes are usually linked through arcs, let $G(V,A)$ represent a directed network of faulty nodes in the system where V is the set of faulty nodes and A is the set of arcs. |V| is the total number of faulty nodes in V. |V| is an integer and |V|≥0. V∈W, A∈Ł, and |V|≤|W|. Let $G(V^F,A^F)$ represent a directed fault network including pseudo nodes. $|V^F|≥|V|$, $V^F \cap W=V$, and $A^F \cap Ł=A$. $|V^F|$ is an integer and $|V^F|≥0$. There are three types of nodes $v_j$'s, $v_j \in V^F$: root nodes $v_r$'s, internal nodes $v_i$'s, and leaf nodes $v_l$'s. Let R, I, and L represent the set of root nodes $v_r$'s, internal nodes $v_i$'s, and leaf nodes $v_l$'s, respectively. |R|, |I|, and |L| are integers. |R|≥0; |I|≥0; and |L|≥0. In some embodiments, any FPR sequence must repair all root nodes $v_r$'s. In some embodiments, $v_i$'s and $v_l$'s are repaired or prevented if and only if all $v_r$'s are repaired. Depending on when $v_r$'s are repaired, $v_i$'s and $v_l$'s may be prevented. Time zero, i.e., t=0, may be defined to help evaluate the FPR sequences. For convenience and in practice, the time at which the first fault occurs is often defined as t=0. Let $t_c$ represent current time and $t_j$ represent the time $v_j$ becomes faulty; $t_c, t_j ≥ 0$. Suppose $t_{10} < t_c < t_9$ in FIG. 9(c). Since $v_9$ has not become faulty at $t_c$, $v_9$ is prevented if $v_{10}$ is repaired before $t_9$. A fault at a root node is not prevented. For any two nodes $v_j$ and $v_j'$, $j \neq j'$, $(v_j, v_j') \in A^F$ if $v_j$ directly causes $v_j'$. This also implies that $t_j \leq t_j'$.

COROLLARY 1: In a directed network $G(V^F,A^F)$ of faulty nodes, $t_j \leq t_j'$ if $(v_j, v_j') \in A^F$. All $v_i$'s and $v_l$'s, $v_i \in I$ and $v_l \in L$, are repaired or prevented if and only if all $v_r$'s, $v_r \in R$, are repaired. R∪I∪L=$V^F$. $|R| \leq |V^F|$, $|I| \leq |V^F|$, and $|L| \leq |V^F|$. $|R|+|I|+|L| \geq |V^F|$.

Having described various characteristics of nodal networks, which may be analyzed according to some embodiments of the present invention in order to generate a failure repair sequence, it is noted that reference throughout this specification to "one embodiment" or "an embodiment" or "an example embodiment" or "an illustrated embodiment" or "a particular embodiment" and the like means that a particular feature, structure or characteristic described in connection with the embodiment is included in at least one embodiment. Thus, the appearances of the phrases "in one embodiment" or "in an embodiment" or "in an example embodiment" or "in this illustrated embodiment" or "in this particular embodiment" and the like in various places throughout this specification are not necessarily all referring to one embodiment or a same embodiment. Furthermore, the particular features, structures, or characteristics of different embodiments may be combined in any suitable manner to form one or more other embodiments.

It also is noted that, unless otherwise explicitly noted or required by context, the word "or" is used in this disclosure in a non-exclusive sense. In addition, unless otherwise explicitly noted or required by context, the word "set" is intended to mean one or more, and the word "subset" is intended to mean a set having the same or fewer elements of those present in the subset's parent or superset.

Further, the phrase "at least" is used herein at times to emphasize the possibility that other elements may exist besides those explicitly listed. However, unless otherwise explicitly noted (such as by the use of the term "only") or required by context, non-usage herein of the phrase "at least" includes the possibility that other elements may exist besides those explicitly listed. For example, the phrase, 'based at least upon A' includes A as well as one or more other additional elements besides A. In the same manner, the phrase, "based upon A" includes A, as well as one or more other additional elements besides A. However, the phrase, 'based only upon A' includes only A.

The term "program" in this disclosure should be interpreted as a set of instructions or modules that may be executed by one or more components in a system, such a controller system or data processing device system, in order to cause the system to perform one or more operations. The set of instructions or modules may be stored by any kind of memory device, such as those described subsequently with respect to the memory device system 1030 shown in FIG. 10. In addition, this disclosure may describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). The word "module" may be defined as a set of instructions.

The word "device" and the phrase "device system" both are intended to include one or more physical devices or sub-devices (e.g., pieces of equipment) that interact to perform one or more functions, regardless of whether such devices or sub-devices are located within a same housing or different housings. In this regard, the word "device", may equivalently be referred to as a "device system".

Further, the phrase "in response to" may be used in this disclosure. For example, this phrase might be used in the following context, where an event A occurs in response to the occurrence of an event B. In this regard, such phrase includes, for example, that at least the occurrence of the event B causes or triggers the event A.

Figure 10:
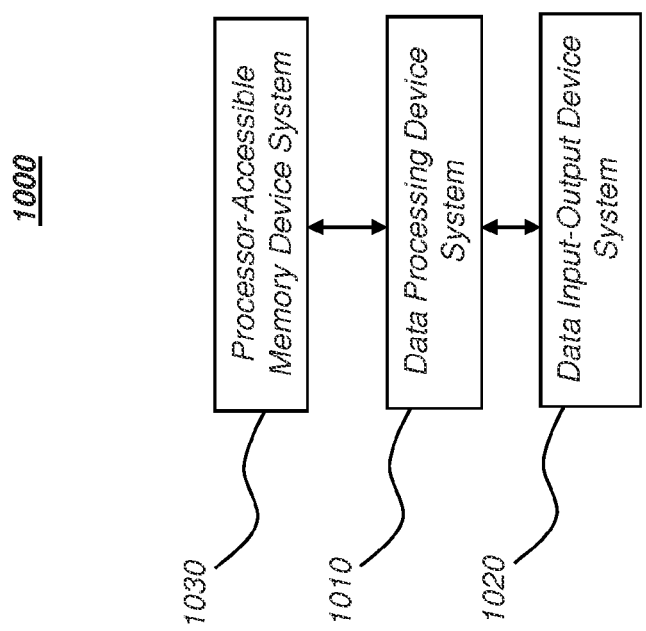
FIG. 10 illustrates a system for generating one or more failure repair sequences, according to some embodiments of the present invention.

FIG. 10 schematically illustrates a failure repair sequence generation device system 1000, according to some embodiments of the present invention. The system 1000 may include a data processing device system 1010, an input-output device system 1020, and a processor-accessible memory device system 1030. The processor-accessible memory device system 1030 and the input-output device system 1020 are communicatively connected to the data processing device system 1010.

The data processing device system 1010 includes one or more data processing devices that implement or execute, in conjunction with other devices, such as those in the system 1000, methods of various embodiments of the present invention, including the example methods of FIGS. 2-8 described herein. Each of the phrases "data processing device", "data processor", "processor", and "computer" is intended to include any data processing device, such as a central processing unit ("CPU"), a desktop computer, a laptop computer, a mainframe computer, tablet computer, a personal digital assistant, a cellular phone, and any other device for processing data, managing data, or handling data, whether implemented with electrical, magnetic, optical, biological components, or otherwise.

The memory device system 1030 includes one or more processor-accessible memory devices configured to store information, including the information needed to execute the methods of various embodiments, including the example methods of FIGS. 2-8 described herein. The memory device system 1030 may be a distributed processor-accessible memory device system including multiple processor-accessible memory devices communicatively connected to the data processing device system 110 via a plurality of computers and/or devices. On the other hand, the memory device system 1030 need not be a distributed processor-accessible memory system and, consequently, may include one or more processor-accessible memory devices located within a single data processing device.

Each of the phrases "processor-accessible memory" and "processor-accessible memory device" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs. In some embodiments, each of the phrases "processor-accessible memory" and "processor-accessible memory device" is intended to include a non-transitory computer-readable storage medium. And in some embodiments, the memory device system 1030 may be considered a non-transitory computer-readable storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 1030 is shown separately from the data processing device system 1010 and the input-output device system 1020, one skilled in the art will appreciate that the memory device system 1030 may be located completely or partially within the data processing device system 1010 or the input-output device system 1020. Further in this regard, although the input-output device system 1020 is shown separately from the data processing device system 1010 and the memory device system 1030, one skilled in the art will appreciate that such system may be located completely or partially within the data processing system 1010 or the memory device system 1030, depending upon the contents of the input-output device system 1020. Further still, the data processing device system 1010, the input-output device system 1020, and the memory device system 1030 may be located entirely within the same device or housing or may be separately located, but communicatively connected, among different devices or housings. In the case where the data processing device system 1010, the input-output device system 1020, and the memory device system 1030 are located within the same device, the system 1000 of FIG. 10 may be implemented by a single application-specific integrated circuit (ASIC) in some embodiments.

The input-output device system 1020 may include a mouse, a keyboard, a touch screen, another computer, a processor-accessible memory device, or any device or combination of devices from which a desired selection, desired information, instructions, or any other data is input to the data processing device system 1010. The input-output device system may include a user-activatable control system that is responsive to a user action. The input-output device system 1020 may include any suitable interface for receiving information, instructions or any data from other devices and systems described in various ones of the embodiments.

The input-output device system 1020 also may include an image generating device system, a display device system, a processor-accessible memory device, or any device or combination of devices to which information, instructions, or any other data is output by the data processing device system 1010. The input-output device system 1020 may include any suitable interface for outputting information, instructions or data to other devices and systems described in various ones of the embodiments.

If the input-output device system 1020 includes a processor-accessible memory device, such memory device may or may not form part or all of the memory device system 1030.

FIG. 1 illustrates a failure prevention and repair ("FPR") system 100 according to some embodiments of the present invention. The system 100, in some embodiments, includes one or more energy distribution networks 110. Although these embodiments pertain to one or more energy distribution networks as an example of one or more nodal networks, it should be noted that any other type of nodal network may be used.

The system 100 also includes, according to some embodiments, a self-detection and self-diagnostics system 120, which may be any such system, known in the art, that may identify or facilitate identification of a topology of a nodal network, such as the one or more energy distribution networks 110, as well as nodal failures or faults within that topology. An example of such a system 120 is the smart grid system, known in the art. In this regard, the system 120 is communicatively connected to the network(s) 110 or at least to information describing a present state of the network(s) 110 in order to identify the topology of the network(s) 110 and nodal faults within that topology.

The system 100 also includes, in some embodiments, a failure prevention and repair ("FPR") sequence generation system 140. The system 140 may be implemented by the system 1000 in FIG. 10. In some embodiments, the system 140 is communicatively connected to and is configured to acquire information directly or indirectly from the self-detection and self-diagnostics system 120 in order to identify, for example, the system network(s) (e.g., FIG. 9(*a*)) and fault network(s) (e.g., FIGS. 9(*b*), 9(*c*)) of the energy distribution network(s) 110. Such acquired information may be stored, for example, in the processor-accessible memory device system 1030 shown in FIG. 10 for subsequent retrieval or acquisition by the data processing device system 1010. The identification of the system network(s) and the fault network(s) may be stored as network information in the processor-accessible memory device system 1030 shown in FIG. 10 for subsequent retrieval or acquisition by the data processing device system 1010. Based at least upon an analysis of at least a portion of such network information (e.g., at least the portion indicating the fault network(s)), the FPR sequence generation system 140 may be configured to generate one or more failure repair sequences, each indicating a sequence of nodes sets in which the nodes sets should be repaired. Each node set may include one or more nodes in at least the fault network(s). In some embodiments, the one or more generated failure repair sequences is stored in the processor-accessible memory device system 1030 shown in FIG. 10 by the data processing device system 1010 for subsequent retrieval by the data processing device system 1010, for outputting to a user, or for outputting to another device system. In this regard, the system 100 may include failure repair resources 130 configured to repair faulty nodes of the energy distribution network(s) 110 according to the one or more failure repair sequences generated by the FPR sequence generation system 140. Examples of failure repair resources, according to some embodiments, include, but are not limited to personnel, time, materials, equipment, transportation, communication, or a combination thereof.

Figure 2:
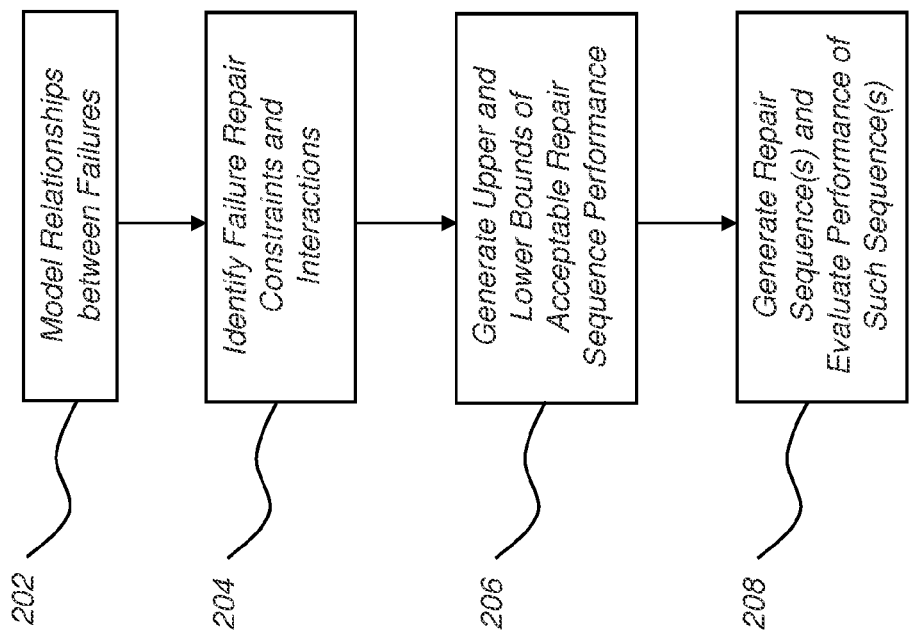
FIG. 2 illustrates a method or workflow that the FPR sequence generation system of FIG. 1 is configured to execute, for example, by a program stored in the processor-accessible memory device system of FIG. 10, according to some embodiments of the present invention.

FIG. 2 illustrates a method or workflow 200 that the FPR sequence generation system 140 is configured to execute, for example, by a program stored in the processor-accessible memory device system 1030, according to some embodiments of the present invention. Although FIG. 2, as well as each of FIGS. 3-8, is illustrated by a certain number of steps and a particular sequence between those steps, it should be noted that the invention is not limited to the performance of all of such steps (or all substeps within each step) or the particular sequence of such steps illustrated.

At step 202, in some embodiments, relationships between failures in the energy distribution network(s) 110 are modeled, for example, to generate or identify applicable system network(s) (e.g., FIG. 9(*a*)), fault network(s) (e.g., FIGS. 9(*b*), 9(*c*)), or both. It should be noted that this step need not be performed by the data processing device system 1010 and, for example, may merely be provided by another device system to the data processing device system 1010 by way of the processor-accessible memory device system 1030. A result of this step may be the storage of network information in the processor-accessible memory device system 1030, the network information defining the applicable system network(s) (e.g., FIG. 9(*a*)), fault network(s) (e.g., FIGS. 9(*b*), 9(*c*)), or both. Some embodiments of step 202 are elaborated upon in FIG. 3, discussed below.

At step 204, in some embodiments, failure repair constraints and interactions are identified. Examples of such constraints and interactions include the failure repair resources 130 from FIG. 1, and particular characteristics, parameters, or conditions associated with such resources that constrain and defining interactions among such resources. It should be noted that this step need not be performed by the data processing device system 1010 and, for example, may merely be provided by another device system to the data processing device system 1010 by way of the processor-accessible memory device system 1030. Some embodiments of step 204 are elaborated upon in FIG. 4, discussed below.

At step 206, an optional step in some embodiments, upper and lower bounds of acceptable repair sequence performance are generated. For example, best case or at least worst-case repair scenarios are generated at step 206 in order to define boundaries with which to evaluate the performance of proposed repair sequences. Some embodiments of step 206 are elaborated upon in FIGS. 5-7, discussed below.

At step 208, in some embodiments, at least one repair sequence is generated based at least upon an analysis of the network information generated or identified according to step 202. Optionally, in some embodiments, the generated repair sequence(s) are evaluated to ensure that only those of sequences that meet performance criteria defined according to step 206 are presented to a user or otherwise output for the possibility of implementation in a repair process. Some embodiments of step 208 are elaborated upon in FIG. 8, discussed below.

Figure 3:
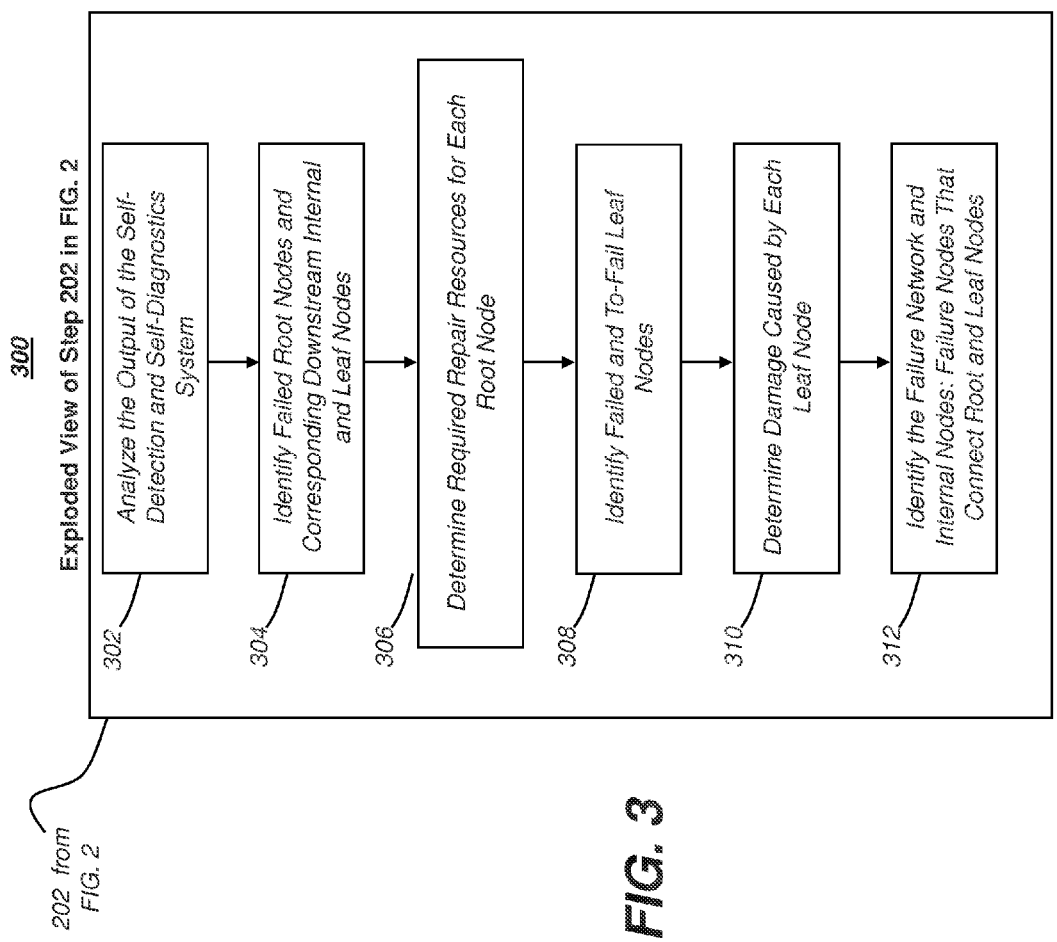
FIG. 3 illustrates an exploded view of step 202 in FIG. 2, according to some embodiments of the present invention.

FIG. 3 illustrates an exploded view of step 202 in FIG. 2, according to some embodiments of the present invention. At step 302, output from the self-detection and self-diagnostics system 120 (FIG. 1) is analyzed at least in order to identify failed root nodes and the corresponding downstream internal nodes and leaf nodes connected to a respective failed root node at step 304. In this regard, at step 304, the internal nodes and the leaf nodes connected to a failed root node may or may not, themselves, be experiencing a failure at the present time. Nonetheless, it may be beneficial to identify internal nodes and leaf nodes not experiencing failure at the present time at step 304, in some embodiments, because such internal nodes and leaf nodes might experience failure in the future due to the failure of at least one root node to which they are connected. Accordingly, in some embodiments, internal nodes and leaf nodes located downstream of a failed root node are identified whether or not each of such internal nodes and leaf nodes are presently experiencing failure.

At step 306, required repair resources for each root node are determined, according to some embodiments of the present invention. In this regard, it should be noted that the failure or non-failure of a node need not be considered a binary decision, and varying degrees of failure may be considered. Any appropriate function tying degrees of failure with repair resources required to remedy the failure may be utilized at step 306, according to design choice. In other words, the present invention is not limited to any particular function that relates failure state to required repair resources at step 306. However, it may be important in some embodiments to understand the resources required to repair each root node when considering which failure repair sequence is most appropriate. For example, a failure repair sequence generation process might be configured to improve or maximize the efficiency of use of available resources 130, and, in order to do so, understanding the resources required to respective root nodes at step 306 will assist the generation of such a failure repair sequence.

At step 308, in some embodiments, failed and to-fail leaf nodes are identified. In this regard, although step 308 is shown separately from step 304, it could be included as part of step 304. Identification of the failed and to-fail leaf nodes may be performed based at least upon an analysis of the information output from the self-detection and self-diagnostics system at step 302 or the information output from step 304. The identified failed and to-fail leaf nodes, in some embodiments, indicate damage caused directly to customers, end-users, environment, or other value points, such as when the leaf nodes represent households in an electrical power grid. In this regard, identifying the failed and to-fail leaf nodes at step 308 assists in determining the damage caused by such leaf nodes at step 310.

At step 312, according to some embodiments, applicable system network(s) (e.g., FIG. 9(a)), fault network(s) (e.g., FIGS. 9(b), 9(c)), or both, is or are generated or identified based at least upon information identified at least at step 304. Although, information from steps 306, 308, or 310 could also be consolidated into the information describing the applicable system network(s) (e.g., FIG. 9(a)), fault network(s) (e.g., FIGS. 9(b), 9(c)), or both.

In some embodiments, the output of step 312 is considered to form at least a portion of network information indicating at least a network topology including a plurality of nodes, where the plurality of nodes includes a plurality of root nodes and a plurality of leaf nodes, each leaf node connected directly or indirectly to at least one root node of the plurality of root nodes, a subset of the plurality of root nodes indicated by the network information as experiencing failure, and a subset of the plurality of leaf nodes indicated by the network information as experiencing failure. However, in some embodiments, the output of step 302 or 304 is considered to form part or all of such network information.

Figure 4:
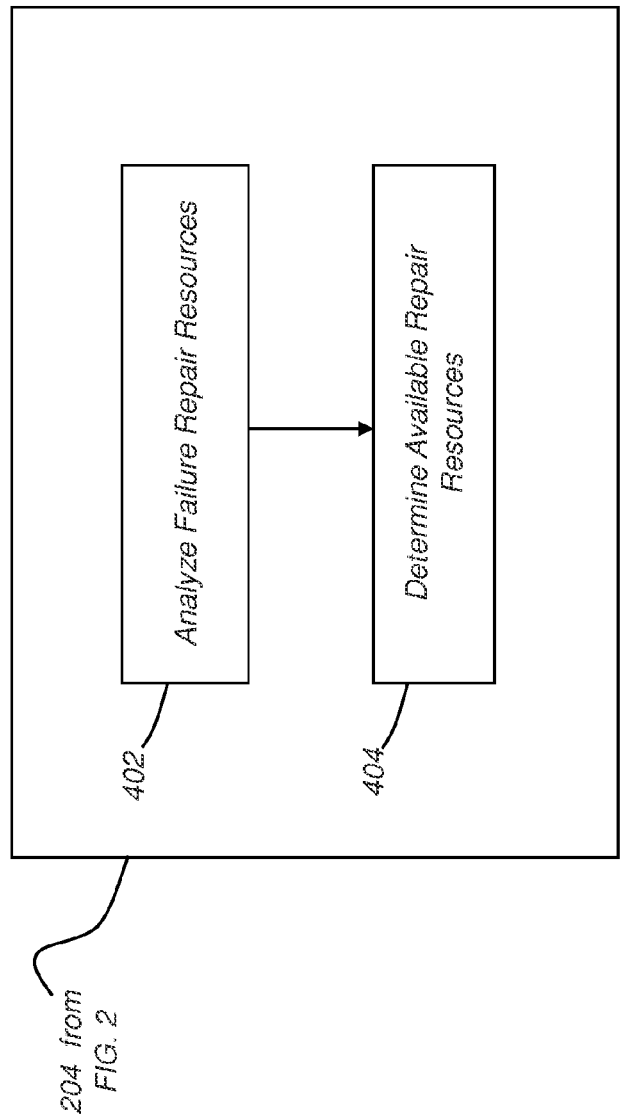
FIG. 4 illustrates an exploded view of step 204 in FIG. 2, according to some embodiments of the present invention.

FIG. 4 illustrates an exploded view of step 204 in FIG. 2, according to some embodiments of the present invention. In this regard, failure repair resources 130 in FIG. 1 are analyzed at step 402 in order to determine what resources are available at step 404. The determination of available resources at step 404 is configured to assist in generating and evaluating the performance of failure repair sequences, for example, at steps 804, 806, and 808, discussed below.

Figure 5:
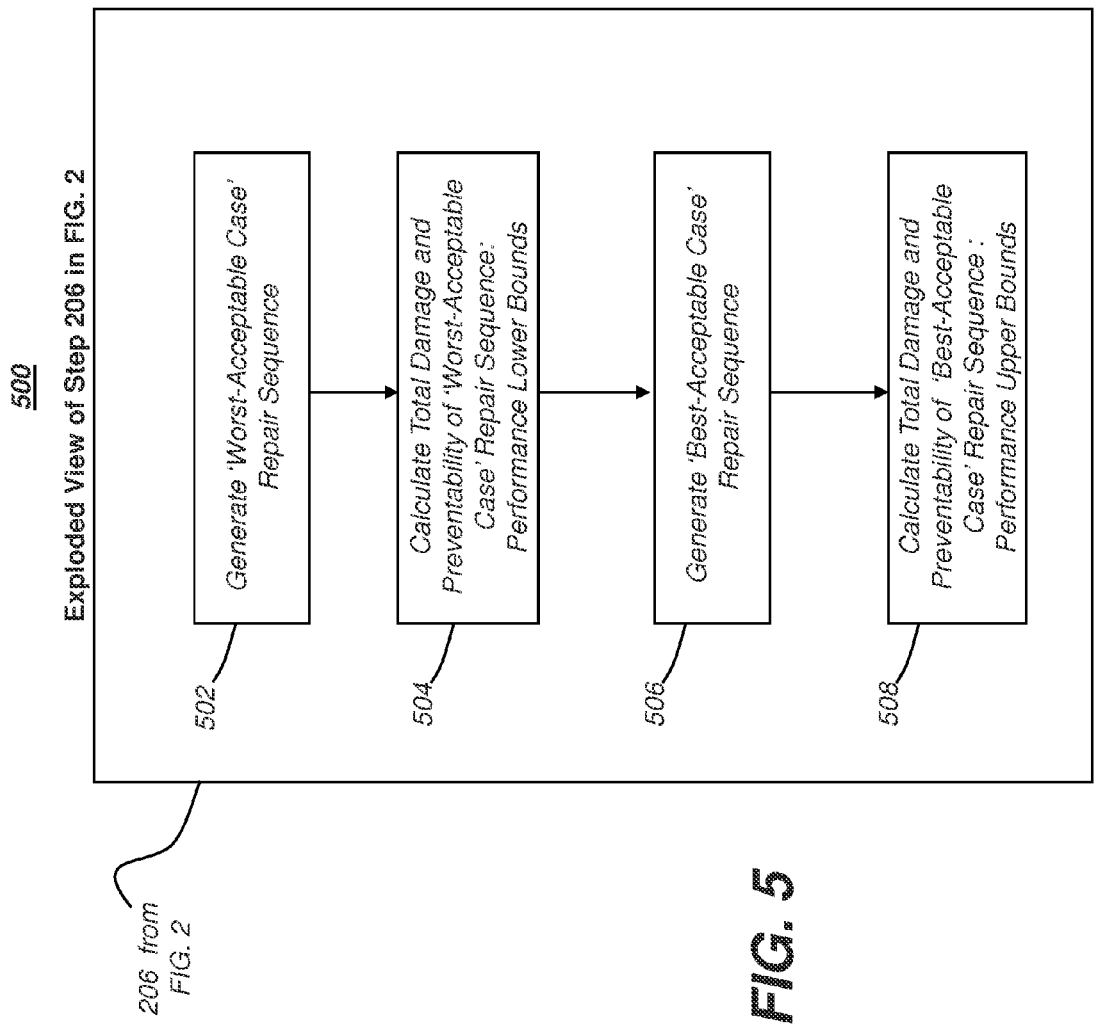
FIG. 5 illustrates an exploded view of step 206 in FIG. 2, according to some embodiments of the present invention.

FIG. 5 illustrates an exploded view of step 206 in FIG. 2, according to some embodiments of the present invention. In this regard, the processes of FIG. 5 generate upper and lower bounds of acceptable repair sequence performance in order to define an acceptable performance range with which to evaluate the performance of proposed repair sequences, pursuant to, e.g., step 808 in FIG. 8 discussed below.

In this regard, a discussion of performance metrics, according to some embodiments of the present invention will now be provided. Since repair cost of a failed network is the same regardless of the chosen failure prevention and repair ("FPR") sequence, two objectives of FPR, according to some embodiments, are to (a) minimize the total damage caused by faults, and (b) prevent the maximum number of faults from occurring. The first objective reflects economical consequences of faults and the second objective reflects social impacts of faults. Damage is a financial measure whereas preventing faults indicates service quality. Two corresponding metrics are defined to measure the performance of an FPR sequence: total damage D (D≥0) and preventability P (0≤P≤1).

Let $c_j$ represent the time $v_j$ is repaired or prevented. $c_j < t_j$ indicates $v_j$ is prevented; $c_j > t_j$ indicates $v_j$ is repaired. Let $p_j$ indicate whether $v_j$ is prevented. $p_j = 0$ if $c_j > t_j$; $p_j = 1$ if $c_j < t_j$. Since time is continuous, the probability that $c_j = t_j$ is zero, i.e., $c_j \neq t_j$. Preventability P is the percentage of faults that are prevented.

$$P = \frac{\sum_{j=1}^{|V^F|} p_j}{|V^F|} \cdot p_j$$

may be expressed in a closed form:

$$p_j = \frac{c_j - t_j - \sqrt{(c_j - t_j)^2}}{2(c_j - t_j)}.$$

Let $d_l$ represent the damage caused by $v_l$ over one time unit; $d_l \geq 0$. The damage caused by $v_l$ is $d_l(c_l - t_l)(1 - p_l)$. The total damage $D = \Sigma_l (c_l - t_l)(1 - p_l)$, $\delta_l^{OUT} = 0$. The objectives of FPR, according to some embodiments, are to minimize D and maximize P. The FPR problem, therefore, may be described as a multi-objective optimization model in Equation (1) (Eq. (1)), below:

$$\min \sum_l d_l \frac{c_l - t_l + \sqrt{(c_l - t_l)^2}}{2} \text{ (minimize the total damage } D\text{)} \quad (1)$$

$$\max \sum_{j=1}^{|V^F|} \frac{c_j - t_j - \sqrt{(c_j - t_j)^2}}{2|V^F|(c_j - t_j)} \text{ (maximize the preventability } P\text{)}$$

such that $$c_j = \max(c_{j'})$$

$$j = 1, \ldots, |V^F|;$$

$$(v_{j'}, v_j) \in A^F;$$

$$\delta_l^{OUT} = 0;$$

$$|V^F| > 0;$$

$$d_l \geq 0$$

$c_j = \max(c_{j'})$ indicates that the time at which $v_j$ ($v_j$ or $v_l$) is repaired or prevented depends on when all its direct causes $v_{j'}$'s are repaired or prevented. For $v_r$'s, $c_r$'s are determined by the FPR sequence. The decision variables in Eq. (1) are $c_r$'s for $v_r$'s, which are times at which root nodes are repaired. $c_i$'s for $v_i$'s and $c_j$'s for $v_j$'s are determined by $c_r$'s. $d_l$'s, $|V^F|$, and $t_j$'s including $t_l$'s are parameters. A feasible solution to this model is an FPR sequence that repairs all $v_r$'s. A goal, according to some embodiments, is to identify efficient points, each of which achieves objective function values D and P that are together superior to what may be achieved by all other feasible solutions. Whether an FPR sequence is an efficient point depends on the parameters and topology of fault networks. Both objective functions in the FPR model are nonlinear and not differentiable, and constraints are nonlinear. It is difficult to solve this nonlinear program. The model in Eq. (2), below, rewrites Eq. (1) and admits only linear constraints, but it does not reduce the difficulty level of finding efficient points since the two objective functions remain nonlinear and not differentiable. In some embodiments, heuristic FPR sequences must be designed and simulation experiments are used to validate and identify efficient sequences.

$$\min \sum_{l} d_l \frac{c_l - t_l + \sqrt{(c_l - t_l)^2}}{2} \quad \text{(minimize the total damage } D\text{)} \quad (2)$$

$$\max \sum_{j=1}^{|V^F|} \frac{c_j - t_j - \sqrt{(c_j - t_j)^2}}{2|V^F|(c_j - t_j)} \quad \text{(maximize the preventability } P\text{)}$$

$\min c_j$ (repair completion time of $v_j$)

such that $c_j \geq (c_{j'})$ $j = 1, \ldots, |V^F|;$ $(v_{j'}, v_j) \in A^F;$ $\delta_l^{OUT} = 0;$ $|V^F| > 0;$ $d_l \geq 0$ With respect to FPR sequences in general, faults are repaired after they are detected and diagnosed. In many applications, repair is more complex and less automated compared to detection and diagnostics. There are often limited resources for FPR. As the order of a fault network increases, more resources are needed to repair faults. With unlimited resources, e.g., unlimited service personnel, all root nodes are repaired simultaneously, which minimizes the total damage D and maximizes the preventability P. When resources are limited, however, there is a need to design efficient FPR sequences that minimize D and maximize P.

Figure 6:
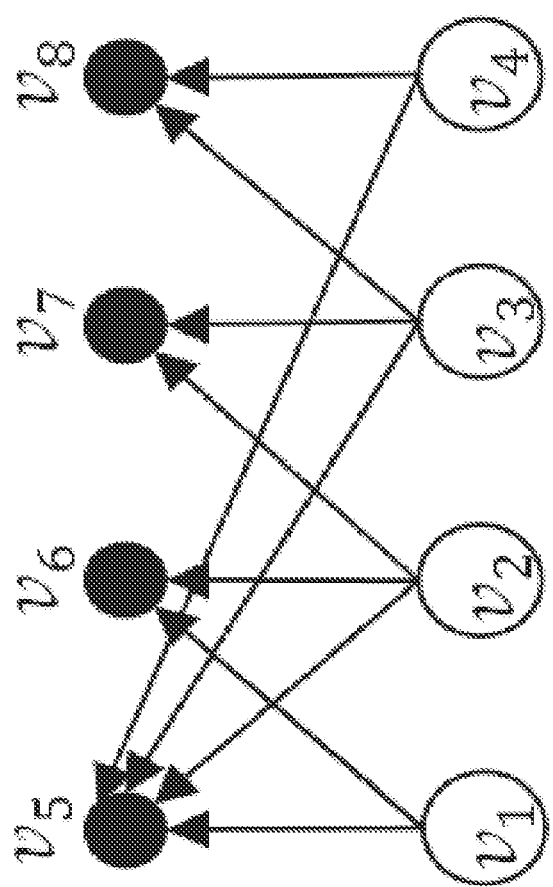
FIG. 6 illustrates a simplified fault network, according to some embodiments of the present invention.

FIG. 6 shows a simplified example of a fault network of $|R|=4$ root nodes $v_1, v_2, v_3$, and $v_4$, and $|L|=4$ leaf nodes $v_5, v_6, v_7$, and $v_8$. $d_5, d_6, d_7$, and $d_8$ are unit time damage of $v_5, v_6, v_7$, and $v_8$, respectively. Let $m_r$ represent the repair time for a root node $v_r$; $m_r \geq 0$. $m_1, m_2, m_3$, and $m_4$ are repair times for $v_1, v_2, v_3$, and $v_4$, respectively. There are $P_{4,4}=4!=24$ possible FPR sequences. In general, there are $|R|$-permutations of $|R|$ FPR sequences, i.e., $|R|!$ FPR sequences, for a fault network of order $|V^F|$; $|R| \leq |V^F|$. Let $t_0$ represent the time at which the FPR sequence begins; $t_0 \geq 0$. All 24 FPR sequences and their respective D and P are summarized in Table 1.

TABLE 1

FPR Sequences and Total Damage and Preventability for the Fault Network in FIG. 6.

| FPR Sequence | Total Damage D | Preventability P |
|---|---|---|
| 1  $v_1 \to v_2 \to v_3 \to v_4$ | $d_5 \max(m_{1,2,3,4} + t_0 - t_5, 0) +$ | $2 - |m_{1,2,3,4} + t_0 - t_5|/2(m_{1,2,3,4} + t_0 - t_5) -$ |
| 2  $v_2 \to v_1 \to v_3 \to v_4$ | $d_6 \max(m_{1,2} + t_0 - t_6, 0) +$ | $|m_{1,2} + t_0 - t_6|/2(m_{1,2} + t_0 - t_6) -$ |
|  | $d_7 \max(m_{1,2,3} + t_0 - t_7, 0) +$ | $|m_{1,2,3} + t_0 - t_7|/2(m_{1,2,3} + t_0 - t_7) -$ |
|  | $d_8 \max(m_{1,2,3,4} + t_0 - t_8, 0)$ | $|m_{1,2,3,4} + t_0 - t_8|/2(m_{1,2,3,4} + t_0 - t_8)$ |
| 3  $v_1 \to v_3 \to v_2 \to v_4$ | $d_5 \max(m_{1,2,3,4} + t_0 - t_5, 0) +$ | $2 - |m_{1,2,3,4} + t_0 - t_5|/2(m_{1,2,3,4} + t_0 - t_5) -$ |
| 4  $v_3 \to v_1 \to v_2 \to v_4$ | $d_6 \max(m_{1,3} + t_0 - t_6, 0) +$ | $|m_{1,3} + t_0 - t_6|/2(m_{1,3} + t_0 - t_6) -$ |
|  | $d_7 \max(m_{1,2,3} + t_0 - t_7, 0) +$ | $|m_{1,2,3} + t_0 - t_7|/2(m_{1,2,3} + t_0 - t_7) -$ |
|  | $d_8 \max(m_{1,2,3,4} + t_0 - t_8, 0)$ | $|m_{1,2,3,4} + t_0 - t_8|/2(m_{1,2,3,4} + t_0 - t_8)$ |
| 5  $v_1 \to v_2 \to v_4 \to v_3$ | $d_5 \max(m_{1,2,3,4} + t_0 - t_5, 0) +$ | $2 - |m_{1,2,3,4} + t_0 - t_5|/2(m_{1,2,3,4} + t_0 - t_5) -$ |
| 6  $v_2 \to v_1 \to v_4 \to v_3$ | $d_6 \max(m_{1,2} + t_0 - t_6, 0) +$ | $|m_{1,2} + t_0 - t_6|/2(m_{1,2} + t_0 - t_6) -$ |
|  | $d_7 \max(m_{1,2,3,4} + t_0 - t_7, 0) +$ | $|m_{1,2,3,4} + t_0 - t_7|/2(m_{1,2,3,4} + t_0 - t_7) -$ |
|  | $d_8 \max(m_{1,2,3,4} + t_0 - t_8, 0)$ | $|m_{1,2,3,4} + t_0 - t_8|/2(m_{1,2,3,4} + t_0 - t_8)$ |
| 7  $v_1 \to v_3 \to v_4 \to v_2$ | $d_5 \max(m_{1,2,3,4} + t_0 - t_5, 0) +$ | $2 - |m_{1,2,3,4} + t_0 - t_5|/2(m_{1,2,3,4} + t_0 - t_5) -$ |
| 8  $v_1 \to v_4 \to v_3 \to v_2$ | $d_6 \max(m_{1,2,3,4} + t_0 - t_6, 0) +$ | $|m_{1,2,3,4} + t_0 - t_6|/2(m_{1,2,3,4} + t_0 - t_6) -$ |
| 9  $v_3 \to v_1 \to v_4 \to v_2$ | $d_7 \max(m_{1,2,3,4} + t_0 - t_7, 0) +$ | $|m_{1,2,3,4} + t_0 - t_7|/2(m_{1,2,3,4} + t_0 - t_7) -$ |
| 10  $v_4 \to v_1 \to v_3 \to v_2$ | $d_8 \max(m_{1,3,4} + t_0 - t_8, 0)$ | $|m_{1,3,4} + t_0 - t_8|/2(m_{1,3,4} + t_0 - t_8)$ |
| 11  $v_1 \to v_4 \to v_2 \to v_3$ | $d_5 \max(m_{1,2,3,4} + t_0 - t_5, 0) +$ | $2 - |m_{1,2,3,4} + t_0 - t_5|/2(m_{1,2,3,4} + t_0 - t_5) -$ |
| 12  $v_2 \to v_4 \to v_1 \to v_3$ | $d_6 \max(m_{1,2,4} + t_0 - t_6, 0) +$ | $|m_{1,2,4} + t_0 - t_6|/2(m_{1,2,4} + t_0 - t_6) -$ |
| 13  $v_4 \to v_1 \to v_2 \to v_3$ | $d_7 \max(m_{1,2,3,4} + t_0 - t_7, 0) +$ | $|m_{1,2,3,4} + t_0 - t_7|/2(m_{1,2,3,4} + t_0 - t_7) -$ |
| 14  $v_4 \to v_2 \to v_1 \to v_3$ | $d_8 \max(m_{1,2,3,4} + t_0 - t_8, 0)$ | $|m_{1,2,3,4} + t_0 - t_8|/2(m_{1,2,3,4} + t_0 - t_8)$ |
| 15  $v_2 \to v_3 \to v_1 \to v_4$ | $d_5 \max(m_{1,2,3,4} + t_0 - t_5, 0) +$ | $2 - |m_{1,2,3,4} + t_0 - t_5|/2(m_{1,2,3,4} + t_0 - t_5) -$ |
| 16  $v_3 \to v_2 \to v_1 \to v_4$ | $d_6 \max(m_{1,2,3} + t_0 - t_6, 0) +$ | $|m_{1,2,3} + t_0 - t_6|/2(m_{1,2,3} + t_0 - t_6) -$ |
|  | $d_7 \max(m_{2,3} + t_0 - t_7, 0) +$ | $|m_{2,3} + t_0 - t_7|/2(m_{2,3} + t_0 - t_7) -$ |
|  | $d_8 \max(m_{1,2,3,4} + t_0 - t_8, 0)$ | $|m_{1,2,3,4} + t_0 - t_8|/2(m_{1,2,3,4} + t_0 - t_8)$ |
| 17  $v_2 \to v_3 \to v_4 \to v_1$ | $d_5 \max(m_{1,2,3,4} + t_0 - t_5, 0) +$ | $2 - |m_{1,2,3,4} + t_0 - t_5|/2(m_{1,2,3,4} + t_0 - t_5) -$ |
| 18  $v_3 \to v_2 \to v_4 \to v_1$ | $d_6 \max(m_{1,2,3,4} + t_0 - t_6, 0) +$ | $|m_{1,2,3,4} + t_0 - t_6|/2(m_{1,2,3,4} + t_0 - t_6) -$ |
|  | $d_7 \max(m_{2,3} + t_0 - t_7, 0) +$ | $|m_{2,3} + t_0 - t_7|/2(m_{2,3} + t_0 - t_7) -$ |
|  | $d_8 \max(m_{2,3,4} + t_0 - t_8, 0)$ | $|m_{2,3,4} + t_0 - t_8|/2(m_{2,3,4} + t_0 - t_8)$ |
| 19  $v_2 \to v_4 \to v_3 \to v_1$ | $d_5 \max(m_{1,2,3,4} + t_0 - t_5, 0) +$ | $2 - |m_{1,2,3,4} + t_0 - t_5|/2(m_{1,2,3,4} + t_0 - t_5) -$ |
| 20  $v_4 \to v_2 \to v_3 \to v_1$ | $d_6 \max(m_{1,2,3,4} + t_0 - t_6, 0) +$ | $|m_{1,2,3,4} + t_0 - t_6|/2(m_{1,2,3,4} + t_0 - t_6) -$ |
|  | $d_7 \max(m_{2,3,4} + t_0 - t_7, 0) +$ | $|m_{2,3,4} + t_0 - t_7|/2(m_{2,3,4} + t_0 - t_7) -$ |
|  | $d_8 \max(m_{2,3,4} + t_0 - t_8, 0)$ | $|m_{2,3,4} + t_0 - t_8, 0|/2(m_{2,3,4} + t_0 - t_8, 0)$ |
| 21  $v_3 \to v_4 \to v_1 \to v_2$ | $d_5 \max(m_{1,2,3,4} + t_0 - t_5, 0) +$ | $2 - |m_{1,2,3,4} + t_0 - t_5|/2(m_{1,2,3,4} + t_0 - t_5) -$ |
| 22  $v_4 \to v_3 \to v_1 \to v_2$ | $d_6 \max(m_{1,2,3,4} + t_0 - t_6, 0) +$ | $|m_{1,2,3,4} + t_0 - t_6|/2(m_{1,2,3,4} + t_0 - t_6) -$ |
|  | $d_7 \max(m_{1,2,3,4} + t_0 - t_7, 0) +$ | $|m_{1,2,3,4} + t_0 - t_7|/2(m_{1,2,3,4} + t_0 - t_7) -$ |
|  | $d_8 \max(m_{3,4} + t_0 - t_8, 0)$ | $|m_{3,4} + t_0 - t_8|/2(m_{3,4} + t_0 - t_8)$ |
| 23  $v_3 \to v_4 \to v_2 \to v_1$ | $d_5 \max(m_{1,2,3,4} + t_0 - t_5, 0) +$ | $2 - |m_{1,2,3,4} + t_0 - t_5|/2(m_{1,2,3,4} + t_0 - t_5) -$ |
| 24  $v_4 \to v_3 \to v_2 \to v_1$ | $d_6 \max(m_{1,2,3,4} + t_0 - t_6, 0) +$ | $|m_{1,2,3,4} + t_0 - t_6|/2(m_{1,2,3,4} + t_0 - t_6) -$ |

TABLE 1-continued

FPR Sequences and Total Damage and Preventability for the Fault Network in FIG. 6.

| FPR Sequence | Total Damage D | Preventability P |
| --- | --- | --- |
| | $d_7\max(m_{2,3,4} + t_0 - t_7, 0) +$ $d_8\max(m_{3,4} + t_0 - t_8, 0)$ | $\|m_{2,3,4} + t_0 - t_7\|/2(m_{2,3,4} + t_0 - t_7) -$ $\|m_{3,4} + t_0 - t_8\|/2(m_{3,4} + t_0 - t_8)$ |

In Table 1, multiple subscripts in $m_r$ represent the summation of repair times. For instance, $m_{1,2,3,4} = m_1 + m_2 + m_3 + m_4$. Some FPR sequences, e.g., the FPR sequences 1 and 2 in Table 1, have the same D and P. Let a pair of brackets, $\langle \ \rangle$, represent that a group of FPR sequences have the same D and P. There are 10 such groups in Table 1: $\langle 1,2 \rangle$, $\langle 3,4 \rangle$, $\langle 5,6 \rangle$, $\langle 7,8,9,10 \rangle$, $\langle 11,12,13,14 \rangle$, $\langle 15,16 \rangle$, $\langle 17,18 \rangle$, $\langle 19,20 \rangle$, $\langle 21,22 \rangle$, and $\langle 23,24 \rangle$. Table 2, below, shows the comparison between $\langle 1,2 \rangle$ and $\langle 3,4 \rangle$. The group $\langle 3,4 \rangle$ causes more damage and has smaller preventability than $\langle 1,2 \rangle$. $\langle 1,2 \rangle$ is better than $\langle 3,4 \rangle$ in terms of both D and P, which may be expressed as $\langle 1,2 \rangle \geq \langle 3,4 \rangle$. Other comparisons among the 10 groups show that $\langle 1,2 \rangle \geq \langle 5,6 \rangle$, $\langle 1,2 \rangle \geq \langle 11,12,13,14 \rangle$, $\langle 15,16 \rangle \geq \langle 3,4 \rangle$, $\langle 5,6 \rangle \geq \langle 11,12,13,14 \rangle$, $\langle 21,22 \rangle \geq \langle 7,8,9,10 \rangle$, $\langle 23,24 \rangle \geq \langle 7,8,9,10 \rangle$, $\langle 17,18 \rangle \geq \langle 19,20 \rangle$, $\langle 23,24 \rangle \geq \langle 19,20 \rangle$, and $\langle 23,24 \rangle \geq \langle 21,22 \rangle$. Total eight out of 24 FPR sequences, or four out of 10 groups of FPR sequences, $\langle 1,2 \rangle$, $\langle 15,16 \rangle$, $\langle 17,18 \rangle$, and $\langle 23,24 \rangle$, have better performance in D and P than other FPR sequences. Depending on the values of $d_i$'s, $m_r$'s, $t_0$, and $t_i$'s, one or more of the eight FPR sequences minimize D and maximize P. This example indicates that the optimal FPR sequence is determined by the structure of a fault network and many parameters in Eq. (1) or Eq. (2).

TABLE 2

Comparison between $\langle 1, 2 \rangle$ and $\langle 3, 4 \rangle$.

| Comparison | Total Damage D | Preventability P |
| --- | --- | --- |
| $\langle 3, 4 \rangle - \langle 1, 2 \rangle$ | $d_6\max(m_{1,2,3} + t_0 - t_6, 0) -$ $d_6\max(m_{1,2} + t_0 - t_6, 0)$ | $\|m_{1,2} + t_0 - t_6\|/2(m_{1,2} + t_0 - t_6) -$ $\|m_{1,2,3} + t_0 - t_6\|/2(m_{1,2,3} + t_0 - t_6)$ |
| $t_6 < m_{1,2} + t_0$ | $d_6 m_3$ | 0 |
| $m_{1,2} + t_0 < t_6 < m_{1,2,3} + t_0$ | $d_6(m_{1,2,3} + t_0 - t_6)$ | −1 |
| $t_6 > m_{1,2,3} + t_0$ | 0 | 0 |

Returning to step 502 in FIG. 5, the 'worst-acceptable case' repair sequence is generated according to a "centralized FPR" sequence generation process, according to some embodiments. A centralized FPR sequence, also referred to as an FPR lower bounds (FPR-L), repairs one root node at a time. For each root node, the FPR-L compares the required repair resources (e.g., step 306 in FIG. 3) and available repair resources (e.g., step 404 in FIG. 4). If the required repair resources are less than or equal to available repair resources, the root node is repaired; otherwise the root node is not repaired. The FPR-L has the centralized control of repairs and does not employ parallelism (simultaneous repairs of multiple root nodes). The FPR-L is expected to have the worst performance and provides the lower bounds (e.g., maximum total damage "D" and minimum percentage of faults prevented "P").

The FPR-L sequence, according to some embodiments, may be described as follows:

Step 1: Randomly select a root node $v_r$; $v_r$ has not been examined for repair;
Step 2: Compare the required repair resources for $v_r$ and available repair resources;
If the required repair resources ≤ available repair resources
Step 3: Repair $v_r$;
Else
Step 4: Go to Step 5;
Step 5: Go to Step 1 if not all $v_r$'s are examined for repair; otherwise stop.

Having generated a repair sequence suitable for a lower bound performance threshold at step 502, total damage D (defined above) and preventability P (defined above) of such sequence is determined at step 504 according to some embodiments of the present invention. The total damage and preventability of such sequence may be used as a lower bound of acceptable performance for determining the acceptability of other repair sequences generated, for example, according to the processes of FIG. 8, discussed below.

At step 506 in FIG. 5, the 'best-acceptable case' repair sequence is generated according to a "decentralized FPR" sequence generation process, according to some embodiments. A decentralized FPR sequence, also referred to as an FPR upper bounds (FPR-U), repairs all root nodes at the same time. The FPR-U repairs each root node using the required repair resources. The FPR-U is a decentralized repair sequence and allows maximum parallelism. The FPR-U has the best performance and provides the upper bounds of performance (e.g., minimum D and maximum P). If the total required repair resources for all root nodes exceed available resources, the upper bounds cannot be reached but represent the ideal best performance.

The FPR-U sequence, according to some embodiments, may be described as follows:

Step 1: Identify the required repair resources for each root node $v_r$;
Step 2: Repair all root nodes $v_r$'s at the same time using the required repair resources for each $v_r$; and
Step 3: Stop after all $v_r$'s are repaired.

Having generated a repair sequence suitable for an upper bound performance threshold at step 506, total damage D (defined above) and preventability P (defined above) of such sequence is determined at step 508 according to some embodiments of the present invention. The total damage and preventability of such sequence may be used as an upper bound of acceptable performance for determining the acceptability of other repair sequences generated, for example, according to the processes of FIG. 8, discussed below.

Figure 7:
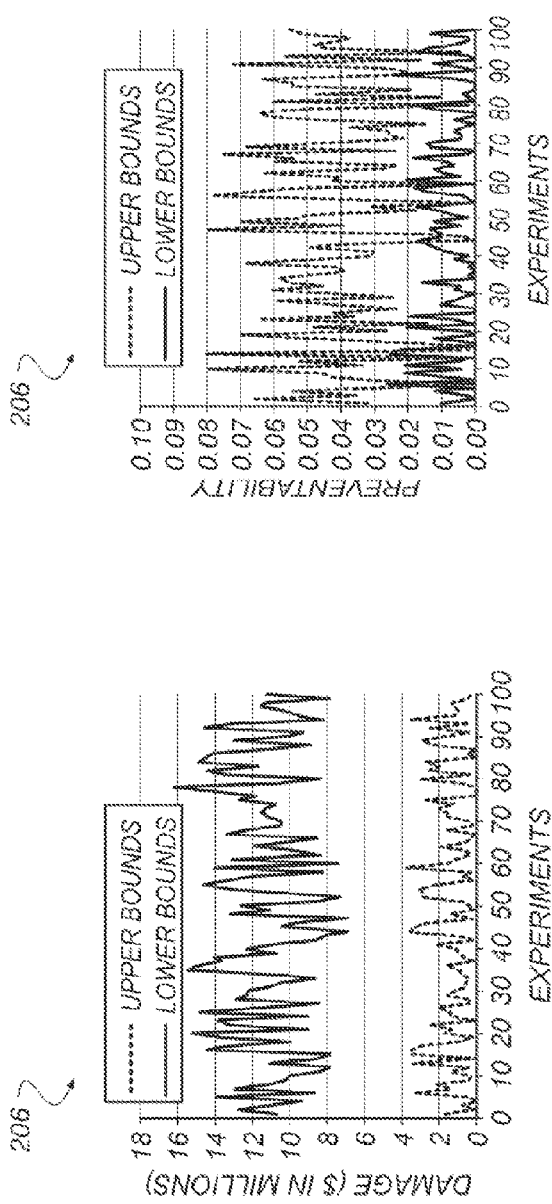
FIG. 7 illustrates an example of upper and lower repair sequence performance bounds, according to some embodiments of the present invention.

Conclusion of the processes of FIG. 5 (or FIG. 2, step 206) results in an identification of lower and upper performance bounds, as shown for example in FIG. 7. The data shown in FIG. 7 was generated by either evaluating the total damage and preventability of each of the above-discussed FPR-L (centralized) and FPR-U (decentralized) repair sequences as applied to the energy grid of the Western United States as it existed in 1998. See Watts, D. J. and Strogatz, S. H., 1998, "Collective dynamics of 'small-world' networks," *Nature*, 393, pp. 440-442. In addition, it was assumed that during a study period of one day, each node has a 10% probability of having a failure, the average time to repair a failure node is five minutes, that the average time to travel between two failure nodes is five minutes, and that the average damage per failure per minute of existence is $10. It was further assumed that the available repair resources (e.g., step 204 from FIG. 2) are sufficient for the repair of all failure nodes at one time.

Figure 8:
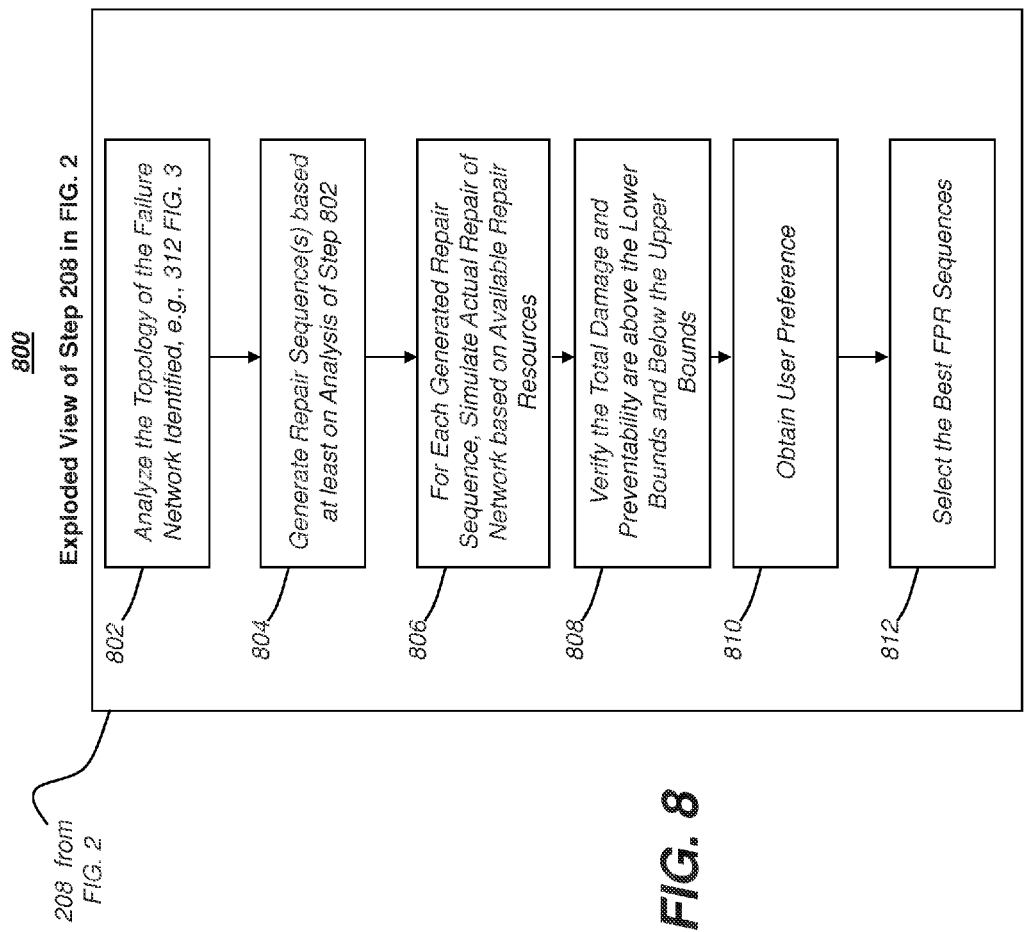
FIG. 8 illustrates an exploded view of step 208 in FIG. 2, according to some embodiments of the present invention.

Having described the development of lower and upper performance bounds with respect to FIG. 5, the discussion now turns to FIG. 8, illustrates an exploded view of step 208 in FIG. 2, according to some embodiments of the present invention, where at least one repair sequence is generated based at least upon an analysis of the network information generated or identified according to step 202.

At step 802, the network information generated, for example, at step 312 in FIG. 3, is analyzed. Such analysis may include an analysis of the network topology indicated by such network information.

At step 804, one or more repair sequences are generated based at least upon the analysis of the network information performed at step 802. According to some embodiments, each failure repair sequence indicates a sequence of node sets in which the node sets should be repaired, each node set including a set of the plurality of nodes of a network topology identified in such network information.

In some embodiments, one or more repair sequences are generated at step 804 to minimize or otherwise reduce total damage D. Each of such repair sequences may be referred to as an "FPR-D sequence", and the process or processes that generate an FPR-D sequence may be referred to simply as "FPR-D" or "the "FPR-D". In this regard, it may be considered that the analysis performed at step 804 includes the performance of FPR-D with respect to the network information including an identification of a network topology generated, e.g., at step 312 in FIG. 3.

Figure 11:
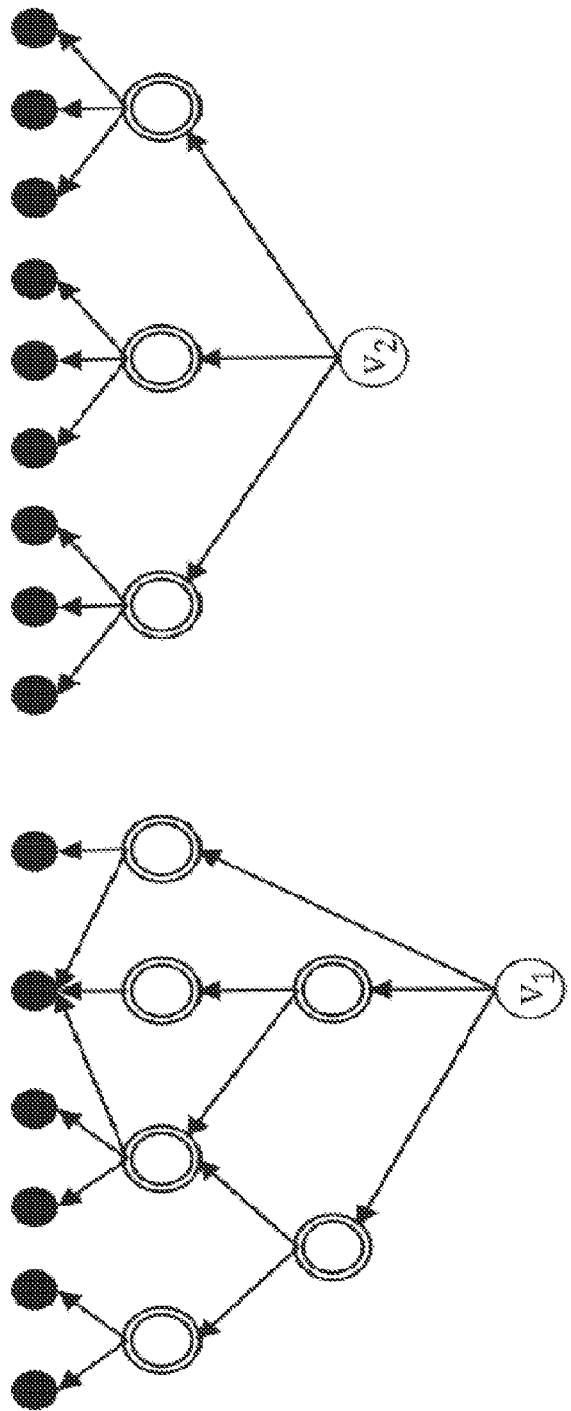
FIG. 11 illustrates a fault network comprised of two disconnected components, each component having one root node, according to some embodiments of the present invention.

In this regard, although the invention does not require minimization, FPR-D aims to minimize total damage D for a fault network. The FPR-D guarantees that D is minimized for a fault network comprised of disconnected components, each of which has one root node (LEMMA 1, discussed below). FIG. 11 shows an example of such a faulty network in which $v_2$ should be repaired before or at least with a higher priority than $v_1$ to minimize D because $n_2=9>n_1=6$. The condition that $m_{r_i/r} >> |t_{l/i/r} - t_{l'i'/r}|$ is common in many systems. For example, when electric power grids experience cascading failures, many nodes such as generators, transformers, and substations become faulty in a short period of time. To repair each faulty node, however, takes relatively long time.

In some embodiments, FPR-D may be described as follows:

Step 1: Select an unrepaired root node $v_r$ such that $n_r \geq n_{r'}$ for $\forall v_{r'}$; $v_{r'}$ is unrepaired. $n_r$ and $n_{r'}$ are the number of leaf nodes $v_l$'s and $v_{l'}$'s, respectively, to which there exists at least one path from $v_r$ and $v_{r'}$, respectively. Randomly select a root node $v_r$ if there are multiple unrepaired $v_r$'s with the same $n_r$;

Step 2: Insert $v_r$ into the repair sequence being generated in the present priority position; and Step 3: Go to Step 1 and advance the present priority position (e.g., a pointer) to the next highest-priority position in the sequence if not all $v_r$'s are repaired or at least inserted into the repair sequence; otherwise stop.

In Step 1 of FPR-D, the unrepaired root node $v_r$ may be considered a damage-priority-repair root node, as it is a root node that needs to be repaired, and it is identified as part of a process that gives priority to reducing damage. In addition, in Step 1 of FPR-D, the condition such that $n_r \geq n_{r'}$ may be considered an identification of the failed root node that has the greatest number of leaf nodes indicated as experiencing or about to experience failure. The phrase, "about to experience failure" may be defined in a manner that accounts for a node that has a possibility or likelihood of failing. This circumstance may be determined in any manner known in the art, such as, but not limited to, by processes performed by the self-detection and self-diagnostics system 120 in FIG. 1. In this case of a leaf node or an intermediate node, this circumstance may be due, at least in part, to failure of an upstream node, such as a root node or internal node connected directly or indirectly to such node.

In this regard, assume that a network topology of a failure network includes or identifies a plurality of nodes, the plurality of nodes including a plurality of root nodes and a plurality of leaf nodes, each leaf node connected directly or indirectly to at least one root node of the plurality of root nodes, a subset of the plurality of root nodes indicated by the network information as experiencing or about to experience failure, and a subset of the plurality of leaf nodes indicated by the network information as experiencing or about to experience failure. In such a case, it may be stated that Step 1 of FPR-D identifies a damage-priority-repair root node of a subset of the plurality of root nodes indicated as experiencing or about to experience failure that has a greatest number of leaf nodes of the subset of the plurality of leaf nodes indicated as experiencing or about to experience failure as compared to at least some other root nodes of the subset of the plurality of root nodes besides the damage-priority-repair root node.

When the damage-priority-repair root node is identified in Step 1 of FPR-D, it is identified for repair in the repair sequence at the presently-pointed-to priority-repair position in the sequence at Step 2 of FPR-D. In other words, Steps 1-3 of FPR-D represent a loop, where the repair sequence is generated one node at a time with each loop iteration in an order of descending repair priority, in some embodiments. For example, the damage-priority-repair root node identified in the first iteration of the loop of Steps 1-3 of FPR-D could be placed in the first position in the repair sequence, the first position indicating the highest damage-priority-repair position where such root node is indicated to be repaired first. The damage-priority-repair root node identified in the second iteration of the loop of Steps 1-3 of FPR-D could be placed in the second position in the repair sequence, the second position indicating the second-highest damage-priority-repair position where such root node is indicated to be repaired second. (However, if enough available resources exist to repair the first and second damage-priority-repair root nodes, it may be considered that the second-highest damage-priority-repair position merely indicates lower priority than the first position and, not necessarily, subsequent repair.) Other root nodes indicated later in the sequence for repair have incrementally lower damage-priority-repair positions.

LEMMA 1: In a fault network G $(V^F, A^F)$, $v_r$ shall be selected for repair to minimize D if there exists at least one path from $v_r$ to $n_r v_l$'s and $n_r \geq n_{r'}$ for $\forall v_{r'}$; $v_r$ and $v_{r'}$ have failed and are unrepaired. G $(V^F, A^F)$ meets four conditions: (a) for $\forall v_l$, except the orphan nodes, there is only one $v_r$ such that there exists at least one path from $v_r$ to $v_l$; (b) $m_{r/r} \gg |t_{l/i/r} - t_{l'/i'/r'}|$ for $\forall v_{l/l'}$, $v_{i/i'}$, and $v_{r/r'}$; (c) $d_l \approx d_{l'}$ for $\forall v_{l/l'}$; and (d) $m_r \approx m_{r'}$ for $v_{r/r''}$.

Proof of LEMMA 1:

Let $v_r$ and $v_{r'}$ represent two root nodes in a fault network G($V^F, A^F$). $v_r$ is the direct or indirect cause of total $n_r$ leaf nodes $v_l$'s, $n_r > 0$; there exists at least one path from $v_r$ to any $v_l$. All $v_l$'s are repaired or prevented if and only if $v_r$ is repaired, i.e., any $v_l$ is not caused directly or indirectly by any root node other than $v_r$. The damage caused by $v_l$ over one time unit is $d_l$. The total damage caused by $v_l$'s is $$\sum_l d_l \frac{c_l - t_l + \sqrt{(c_l - t_l)^2}}{2}.$$

Suppose the difference between the times at which faults occur is much smaller than the repair time for a faulty node, i.e., $m_r \gg |t_{l/i/r} - t_{l'/i'/r'}|$. Since $t_0$ represents the time at which the FPR sequence begins and $t_0 \geq 0$, $m_r + t_0 \gg |t_{l/i/r} - t_{l'/i'/r'}|$. Because $c_l - t_l \geq m_r + t_0$, $c_l - t_l \gg |t_{l/i/r} - t_{l'/i'/r'}|$ for $\forall v_l$. The total damage caused by $v_l$'s is $\Sigma_l d_l(c_l - t_l)$. For $v_{r'}$, the total damage caused by $v_{l'}$'s is $\Sigma_l d_l(c_{l'} - t_{l'})$; $v_{r'}$ is the direct or indirect cause of total $n_{r'}$ leaf nodes $v_{l'}$'s, $n_{r'} > 0$. Because the difference between the times at which faults occur is small, $t_{l/i/r} \approx t_{l'/i'/r'} = t$, the total damages caused by $v_l$'s and $v_{l'}$'s are $\Sigma_l d_l(c_l - t)$ and $\Sigma_l d_l(c_{l'} - t)$, respectively. If $v_r$ is repaired before $v_{r'}$, i.e., $c_l - t = m_r$ and $c_{l'} - t = m_r + m_{r'}$, the total damage caused by $v_l$'s and $v_{l'}$'s is $n_r m_r \overline{d_l} + n_{r'}(m_r + m_{r'}) \overline{d_{l'}}$, where $\overline{d_l}$ and $\overline{d_{l'}}$ are the mean unit time damages caused by $v_l$'s and $v_{l'}$'s, respectively. If $v_{r'}$ is repaired before $v_r$, the total damage caused by $v_l$'s and $v_{l'}$'s is $n_r(m_r + m_{r'})\overline{d_l} + n_{r'} m_{r'} \overline{d_{l'}}$. If we further assume that $\overline{d_l} \approx \overline{d_{l'}} = \overline{d}$, $\overline{d} > 0$, and $m_r \approx m_{r'} = m_{r/r'}$, $m_{r/r'} > 0$, the total damage is $(n_r m_{r/r'} + 2n_{r'} m_{r/r'})\overline{d}$ if $v_r$ is repaired before $v_{r'}$, and $(2n_r m_{r/r'} + n_{r'} m_{r/r'})\overline{d}$ if $v_{r'}$ is repaired before $v_r$. To minimize the total damage D, $v_r$ is repaired first if $n_r > n_{r'}$; $v_{r'}$ is repaired first if $n_{r'} > n_r$; either $v_r$ or $v_{r'}$ may be repaired first if $n_r = n_{r'}$.

This completes the proof of LEMMA 1.

In some embodiments, one or more repair sequences are generated at step 804 to maximize or otherwise improve preventability P. Each of such repair sequences may be referred to as an "FPR-P sequence", and the process or processes that generate an FPR-P sequence may be referred to simply as "FPR-P" or the "FPR-P". In this regard, it may be considered that the analysis performed at step 804 includes the performance of FPR-P with respect to the network information including an identification of a network topology generated, e.g., at step 312 in FIG. 3.

Figure 12:
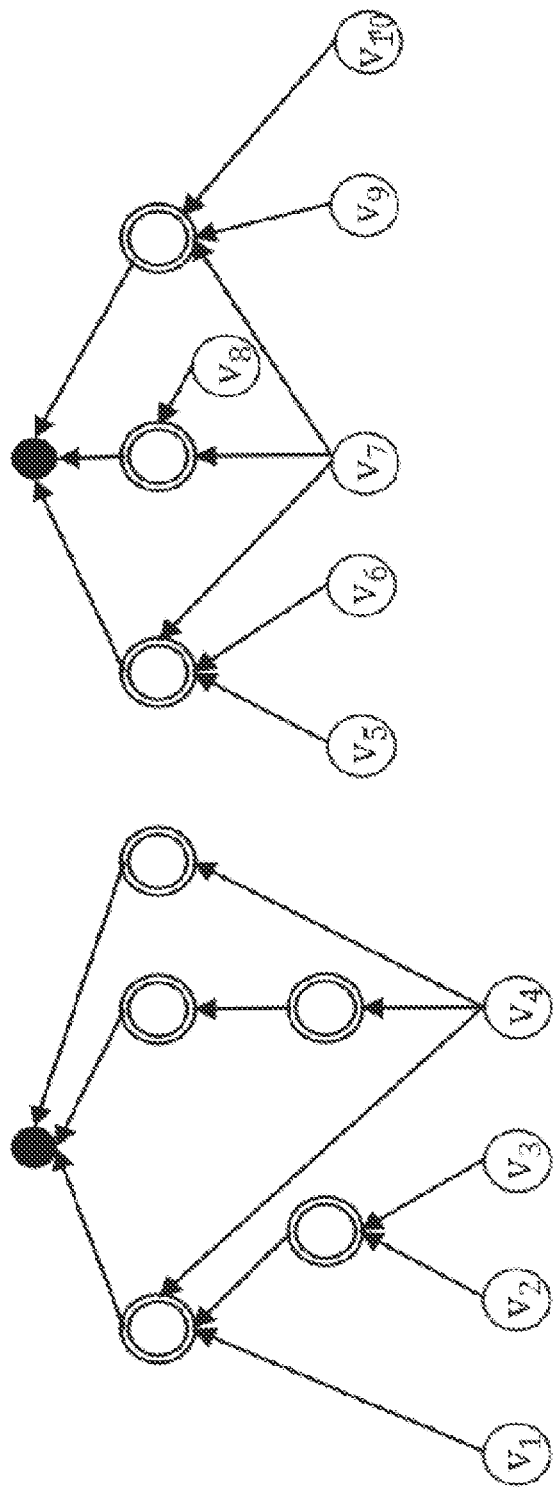
FIG. 12 illustrates a fault network comprised of two disconnected components, each component having one leaf node, according to some embodiments of the present invention.

In this regard, although the invention does not require maximization, FPR-P aims to maximize P for a fault network. The FPR-P guarantees that P is maximized for a fault network comprised of disconnected components, each of which has one leaf node (LEMMA 2, discussed below). In FIG. 12, $v_1$, $v_2$, $v_3$, and $v_4$ should be repaired before or at least with a higher priority than $v_5$, $v_6$, $v_7$, $v_8$, $v_9$, and $v_{10}$. Faults in many complex systems may be prevented. For example, most nodes become faulty almost instantaneously when electric power grids experience cascading failures. Some leaf nodes have backup power supply and can sustain operations for a certain period of time. Faults at these nodes may be prevented if root nodes are repaired before the backup power runs out.

In some embodiments, FPR-P may be described as follows:

Step 1: Select a leaf node $v_l$, at which faults have not occurred, such that $n_l \leq n_{l'}$ for $\forall v_{l'}$; faults at $v_{l'}$ have not occurred. $n_l$ and $n_l'$ are the number of root nodes $v_r$'s and $v_{r'}$'s, respectively, from which there exists at least one path to $v_l$ and $v_{l'}$, respectively. Randomly select a leaf node $v_l$ if there are multiple $v_l$'s with the same $n_l$;

Step 2: Insert all $n_l$ $v_r$'s into the repair sequence being generated in the present priority position; and Step 3: Go to Step 1 and advance the present priority position (e.g., a pointer) to the next highest-priority position in the sequence if not all $v_l$'s are prevented; otherwise stop.

In Step 1 of FPR-P, a leaf node is identified that is not indicated as experiencing failure and is connected to a fewest number of root nodes as compared to at least some other leaf nodes not indicated as experiencing or about to experience failure. Then, according to some embodiments, in Step 2 of FPR-P, all failed nodes connected directly or indirectly to such leaf node, including each root node, are identified for repair and inserted as a group into the repair sequence, all nodes in the group having the same priority (at least at this point in time).

One of the root nodes in this group of nodes (assuming there is more than one root node) may be considered a preventability-priority-repair root node, as it is a root node that needs to be repaired, and it is identified as part of a process that gives priority to increasing preventability. In addition, this preventability-priority-repair root node is a root node from a subset of a plurality of root nodes indicated as experiencing or about to experience failure in the network information from, e.g., step 312 in FIG. 3. Further, this preventability-priority-repair root node has a connected leaf node that (i) is not indicated as experiencing failure and (ii) is connected to a fewest number of root nodes as compared to at least some other leaf nodes of the plurality of leaf nodes not indicated as experiencing or about to experience failure.

Steps 1-3 of FPR-P represent a loop in which each iteration of the loop inserts a group of nodes into a present priority position in the repair sequence. For example, the first iteration might insert a first group of nodes into a highest repair priority position in the repair sequence, and the second iteration might insert a second group of nodes into the second-highest repair priority position in the sequence, etc., similar to the discussion above with respect to FPR-D, but with node-groups involved.

LEMMA 2: In a fault network G($V^F, A^F$), all $n_l$ $v_r$'s shall be selected for repair to maximize P if there exists at least one path from $v_r$ to $v_l$ and $n_l \leq n_{l'}$ for $\forall v_{l'}$; faults at $v_l$ and $v_{l'}$ have not occurred. G($V^F, A^F$) meets three conditions: (a) for $\forall v_r$, except the orphan nodes, there is only one $v_l$ such that there exists at least one path from $v_r$ to $v_l$; (b) $t_l \approx t_{l'}$ for $\forall v_{l/l'}$; and (c) $m_r \approx m_{r'}$ for $v_{r/r''}$.

Proof of LEMMA 2:

Let $v_l$ and $v_{l'}$ represent two leaf nodes in a fault network G($V^F, A^F$). Faults at $v_l$ and $v_{l'}$ have not occurred and may be prevented. $v_l$ is caused by total $n_l$ root nodes $v_r$'s, $n_l > 0$; there exists at least one path from any $v_r$ to $v_l$. $v_l$ is repaired or prevented if and only if all $n_l$ $v_r$'s are repaired. Any $v_r$ does not cause faults at other leaf nodes other than $v_l$. Similarly, $v_{l'}$ is caused by total $n_{l'}$ root nodes $v_{r'}$'s, $n_{l'} > 0$; there exists at least one path from any $v_{r'}$ to $v_{l'}$. Any $v_{r'}$ does not cause faults at other leaf nodes other than $v_{l'}$.

Repairing root nodes may be able to prevent faults at leaf nodes from occurring. Assume that $t_{l'} \approx t_l > 0$, i.e., faults at leaf nodes occur at the same time, and $m_{r'} \approx m_r > 0$, i.e., repair time for any root node is the same. Without losing generality, assume that $n_l \leq n_{l'}$. Therefore $m_r n_l \leq m_r n_{l'}$. $m_r n_l$ is the minimum required time to repair or prevent faults at $v_l$. $m_r n_{l'}$ is the minimum required time to repair or prevent faults at $v_{l'}$. $t_0$ is the time at which the FPR sequence begins; $t_0 \geq t_r$ and $t_0 \geq t_{r'}$. The time at which faults at the leaf nodes occur, $t_l$ or $t_{l'}$, falls into four intervals: $t_{l/l'} < m_r n_l + t_0$, $m_r n_l + t_0 \leq t_{l/l'} < m_r n_{l'} + t_0$, $m_r n_{l'} + t_0 \leq t_{l/l'} < m_r n_l + m_r n_{l'} + t_0$, and $t_{l/l'} \geq m_r n_l + m_r n_{l'} + t_0$.

If $t_{l/l'} < m_r n_l + t_0$, $t_{l/l'} < m_r n_{l'} + t_0$ because $m_r n_l \leq m_r n_{l'}$. Neither $v_l$ nor $v_{l'}$ may be prevented. P=0. If $m_r n_l + t_0 \leq t_{l/l'} < m_r n_{l'} + t_0$, $v_{l'}$ cannot be prevented. To maximize P, $v_r$'s are repaired before the repair of $v_{r'}$'s.

$$P = \frac{1}{|V^F|}$$

it all $n_l$ $v_r$'s are repaired. P=0 if $v_{r'}$'s are repaired first or a mix of $v_r$'s and $v_{r'}$'s are repaired such that not all $n_l$ $v_r$'s are repaired by $t_{l/l'}$. If $m_r n_{l'} + t_0 \leq t_{l/l'} < m_r n_l + m_r n_{l'} + t_0$, either $v_l$ or $v_{l'}$ may be prevented, but not both.

$$P = \frac{1}{|V^F|}$$

if all $n_l$ $v_r$'s are repaired first or all $n_{l'}$ $v_{r'}$'s are repaired first. P=0 if a mix of $v_r$'s and $v_{r'}$'s are repaired; not all $n_l$ $v_r$'s are repaired by time $t_{l/l'}$ and neither are $n_{l'}$ $v_{r'}$'s. If $t_{l/l'} \geq m_r n_l + m_r n_{l'} + t_0$, both $v_l$ and $v_{l'}$ are prevented and $$P = \frac{2}{|V^F|}$$

regardless of the FPR sequence. In summary, repairing all $n_l$ $v_r$'s first always maximizes P.

This completes the proof of LEMMA 2.

In some embodiments, the network topology analysis of step 802 leads to a selection of which failure repair sequence generation process or processes is or are performed at step 804. For example, the network topology analysis of step 802 may be configured to determine whether each of all or substantially all root nodes has the same or approximately the same number of leaf nodes. If so, it is determined that FPR-D will not be effective and, therefore, FPR-P is selected for performance at step 804, according to some embodiments. To elaborate, if each of all or substantially all root nodes has the same or approximately the same number of leaf nodes, the data processing device system 1010 may be configured to determine that FPR-D, which, according to some of the above-discussed embodiments, attempts to give repair priority to root nodes having the greatest number of leaf nodes, is not sufficiently effective to reduce total damage D in this type of network. Therefore, the data processing device system 1010 may be configured at least to select FPR-P for performance at step 804 in this circumstance.

In this regard, it is noted that the data processing device system 1010 may be configured by a program at least to determine whether to perform FPR-D, FPR-P, or both (as discussed in more detail below) based at least upon a preliminary analysis of the network topology indicated by network information at step 802. In some embodiments, if the network topology includes low-level internal nodes, e.g., nodes each directly connected to at least one leaf node, the preliminary analysis may be configured to lead to a determination of performing FPR-P at step 804 in response to a determination that each of the low-level internal nodes is directly connected to a same or substantially a same number of leaf nodes as compared to the other low-level internal nodes, according to some embodiments.

On the other hand, the preliminary analysis may be configured to determine whether each of the leaf nodes is connected to a same or substantially a same number of different root nodes as the other leaf nodes. In this case, the data processing device system 1010 may be configured by a program at least to select FPR-D for performance at step 804. To elaborate, if an analysis of the network topology reveals that all or substantially all leaf nodes are connected to the same or substantially the same number of root nodes, the data processing device system 1010 may be configured to determine that FPR-P, which, according to some of the above-discussed embodiments, attempts to give repair priority to node groups associated with a leaf node that is connected to the greatest number of different failed root nodes, would not be sufficiently effective. Therefore, the data processing device system 1010 may be configured to at least select FPR-D for performance at step 804 in this circumstance.

The analysis (or preliminary analysis in some embodiments) of the network topology at step 802 need not cause the selection of a single failure repair sequence generation process at step 804 and may, instead, cause the selection of multiple or a combination of failure sequence generation processes at step 804. In fact, performance of multiple or a combination of failure sequence generation processes independent of the analysis of network topology at step 802, for example, merely by default or user preference. For instance, step 804 may be configured to merely perform multiple or combinations of failure repair sequence generation processes, evaluate their respective performances at steps 806 and 808, and output the best performing sequences at step 810 or 812 (for example, if user-preference is not obtained).

Some embodiments of the present invention perform a combination of FPR-P and FPR-D at step 804. In some of these embodiments, FPR-P is performed first to generate a first sequence comprising a sequence of groups of nodes, e.g., each group having a higher repair priority than a successive group, as discussed above with respect to FPR-P. For example, the highest priority node group could include nodes B, C, and A, and the next-highest priority node group could include nodes F, E, and D. Since embodiments of FPR-P provide priorities to successive node groups, but not necessarily to the nodes within each group, FPR-D may be performed on the respective sub-network to which each node group belongs to provide repair sequencing to the nodes within the respective group. For example, the above-discussed highest priority node group might be rearranged, for example purposes only, to have a repair sequence of nodes A, B, and C, and the second-highest priority node group could be rearranged, for example purposes only, to have a repair sequence of nodes D, E, and F.

In this regard, in some embodiments, the data processing device system 1010 is configured by a program at least to generate at least a portion of a failure repair sequence at least by (i) preliminarily generating a first sequence based at least upon repeatedly performing FPR-P, the first sequence including a sequence of groups of nodes indicating an order in which the groups of nodes should be repaired, and (ii) generating an intra-group sequence for each of the plurality of groups of nodes based at least upon repeatedly performing FPR-D, each intra-group sequence being a sequence of nodes indicating an order in which the nodes in each respective group should be repaired. In this regard, the failure repair sequence may represent at least the sequence of groups of nodes of the first sequence with each group having its respective intra-group sequence of nodes. For example, the highest priority node group could have an intra-group sequence of nodes A, B, then C, and the second-highest priority node group could have an intra-group sequence of nodes D, E, then F.

Another approach, according to some embodiments, is to perform FPR-D at step 804, and to perform FPR-P at step 804 for any group of root nodes that have been determined to have the same number of leaf nodes as experiencing failure or about to experience failure as part of FPR-D. In other words, as discussed above, FPR-D, step 1, described above, states that, if there are multiple unrepaired $v_r$'s with the same $n_r$, randomly select a root node $v_r$. However, this need not be the case. Instead of randomly selecting a root node in this situation, FPR-P may be performed to decide between the multiple unrepaired $v_r$'s with the same $n_r$. (In this regard, it is noted that a similar process may be applied to step 1 of FPR-P, discussed above, where, instead of randomly selecting a leaf node if there are multiple $v_l$'s with the same $n_l$, FPR-D may be applied to select a leaf node.)

In this regard, in some embodiments, the data processing device system 1010 is configured by a program at least to generate at least a portion of a failure repair sequence at least by (i) identifying, based at least upon performance of step 1 of FPR-D, at least two root nodes having a same greatest number of leaf nodes experiencing or about to experience failure as compared to at least some other root nodes experiencing or about to experience failure, the at least two root nodes forming a group of root nodes, and (ii) generating an intra-group sequence for the group of root nodes based at least upon performing FPR-P, the intra-group sequence being a sequence of the at least two root nodes indicating an order in which the at least two root nodes should be repaired. In this case, the generated failure repair sequence represents at least this intra-group sequence.

At step 806, each failure repair sequence generated at step 804 may be input to a repair simulation process based on the available failure repair resources 130 (FIG. 1), and performance metrics are generated based on such simulation process, according to some embodiments. Such performance metrics may include total damage D and preventability P in some embodiments.

In this regard, at step 806, the data processing device system 1010 may be configured by a program to determine a performance for each of the plurality of generated failure repair sequences from step 804 based at least upon an analysis of repair resource information (e.g., information stored in the memory device system 1030 describing the available failure repair resources from step 404 in FIG. 4) with respect to the respective generated failure repair sequence.

Figure 13:
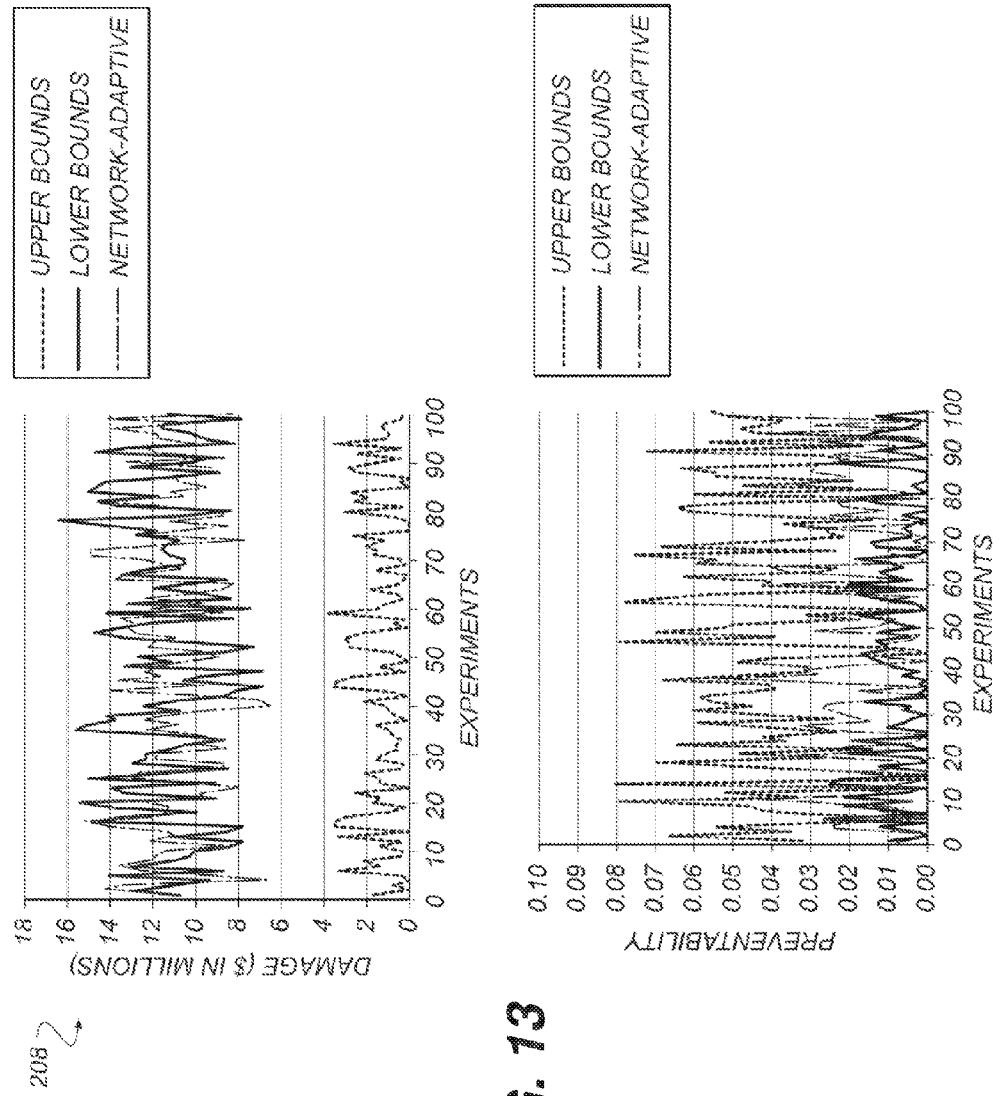
FIG. 13 illustrates a performance comparison between a generated failure repair sequence and lower and upper performance bounds, according to some embodiments of the present invention.

At step 808, the total damage D and the preventability P for each failure repair sequence generated at step 804 is compared to the upper and lower performance bounds calculated at step 206 (FIG. 2) and FIG. 5. Example data in this regard is illustrated in FIG. 13, which illustrates at top a comparison between the total damage D of a failure repair sequence titled "Network-Adaptive" and upper ("Centralized") and lower ("Decentralized") performance bounds. FIG. 13 illustrates at bottom a comparison between the preventability P of the failure repair sequence titled "Network-Adaptive" and upper ("Centralized") and lower ("Decentralized") performance bounds.

In this regard, at step 808, the data processing device system 1010 may be configured by a program to determine whether each of the plurality of generated failure repair sequences from step 804 has acceptable performance or unacceptable performance based at least upon an analysis of the determined performance from step 806 of the respective generated failure repair sequence and the upper-bound threshold and the lower-bound threshold from step 206 in FIG. 2 and FIG. 5. At least one or more changes in the memory device system 1030 may be recorded to indicate which of the generated failure repair sequences have unacceptable performance or acceptable performance. In this regard, failure repair sequences that have unacceptable performance may be deleted from the memory device system 1030.

At step 810, the generated failure repair sequences that are within acceptable performance boundaries pursuant to the comparisons performed at step 808 may be presented to a user for selection (e.g. via data input-output device system 1020), with the selected sequence or combination of sequences being stored in the processor-accessible memory device system 1030 as indicated for execution or implementation as part of a network repair process at step 812. It is noted that user selection is not required at step 810, and the best-performing failure repair sequence may, instead, automatically be selected for execution or implementation according to some embodiments.

In some embodiments, upper and lower performance bounds need not be set according to, for example, centralized and decentralized repair approaches, and another acceptable repair performance metric may be determined or predetermined. For example, a user may predefine an acceptable total damage amount or amount range, an acceptable preventability rate or rate range, or both an acceptable total damage amount or amount range and an acceptable preventability rate or rate range. With such information, step 804 may be configured to generate one or more repair sequences that meet these performance metrics (steps 806 and 808), and those repair sequences that meet these performance metrics while minimizing or otherwise exhibiting a preferred available resource (FIG. 4, step 404) usage may be selected for implementation or execution at step 812. In this regard, in some embodiments, the memory device system 1030 may store repair resource information (e.g., FIG. 4, step 404) indicating at least resources available for node repair. In some of these embodiments, the data processing device system may be further configured by a program at least to receive an indication of acceptable repair performance (e.g., from the memory device system 1030, which may have been by way of user-input via the data input-output device system 1020); and generate the failure repair sequence to meet the acceptable repair performance while minimizing or otherwise exhibiting a preferred usage of the resources available for node repair.

It is to be understood that the exemplary embodiments are merely illustrative of the present invention and that many variations of the above-described embodiments may be devised by one skilled in the art without departing from the scope of the invention. It is therefore intended that all such variations be included within the scope of the following claims and their equivalents. In this regard, not all steps shown in the figures are required, and such steps need not be performed in the order illustrated. Only those steps recited in the following independent claims and their equivalents are required.

What is claimed is:

1. A failure repair sequence generation system comprising:
a data processing device system;
a memory device system communicatively connected to the data processing device system and storing a program executable by the data processing device system, the memory device system storing network information indicating at least a network topology comprising a plurality of nodes, the plurality of nodes comprising a plurality of root nodes and a plurality of leaf nodes, each leaf node connected directly or indirectly to at least one root node of the plurality of root nodes, a subset of the plurality of root nodes indicated by the network information as experiencing failure or indicated by the network information prior to experiencing failure, a subset of the plurality of leaf nodes indicated by the network information as experiencing failure or indicated by the network information prior to experiencing failure, and the data processing device system configured by the program at least to:
acquire, from the memory device system, the network information;
generate a failure repair sequence based at least upon an analysis of at least a portion of the network information, the failure repair sequence indicating a sequence of node sets in which the node sets are to be repaired, each node set comprising a node of the plurality of nodes, and the analysis comprising:
(a)
(1) identifying a damage-priority-repair root node of the subset of the plurality of root nodes, which is also a subset of the plurality of nodes, indicated as experiencing failure that has a greatest number of leaf nodes of the subset of the plurality of leaf nodes indicated as experiencing failure as compared to at least some other root nodes of the subset of the plurality of root nodes besides the damage-priority-repair root node,
(2) assigning the identified damage-priority-repair root node a damage-priority-repair position in the sequence of node sets as compared to the at least some other root nodes of the subset of the plurality of root nodes besides the damage-priority-repair root node, the damage-priority-repair position being a position in the sequence of node sets that indicates that the identified damage-priority-repair root node is to be repaired with a higher priority than the at least some other root nodes of the subset of the plurality of root nodes besides the damage-priority-repair root node, and
(b)
(1) identifying a preventability-priority-repair root node of the subset of the plurality of root nodes indicated as experiencing failure or prior to experiencing failure that has a connected leaf node of the plurality of leaf nodes that (i) is not indicated as experiencing failure and (ii) is connected to a fewest number of root nodes as compared to at least some other leaf nodes of the plurality of leaf nodes not indicated as experiencing failure or prior to experiencing failure,
(2) assigning the identified preventability-priority-repair root node a preventability-priority-repair position in the sequence of node sets as compared to at least some other root nodes of the subset of the plurality of root nodes besides the preventability-priority-repair root node, the preventability-priority-repair position being a position in the sequence of node sets that indicates that the identified preventability-priority-repair root node is to be repaired with a higher priority than the at least some other root nodes of the subset of the plurality of root nodes besides the preventability-priority-repair root node;
and
storing the generated failure repair sequence in the memory device system.

2. The failure repair sequence generation system of claim 1, wherein the memory device system stores repair resource information indicating at least resources available for node repair, and wherein the data processing device system is further configured by the program at least to:
generate a plurality of failure repair sequences including the generated failure repair sequence;
generate a lower-bound-performance sequence based at least upon an analysis of the network information, the lower-bound-performance sequence representing a repair sequence having a repair duration defined as a lower-bound threshold;
generate an upper-bound-performance sequence based at least upon an analysis of the network information, the upper-bound-performance sequence representing a repair sequence having a repair duration shorter than the repair duration of the repair sequence represented by the lower-bound-performance sequence and defined as an upper-bound threshold;
determine a performance for each of the plurality of generated failure repair sequences based at least upon an analysis of the repair resource information with respect to the respective generated failure repair sequence;
determine whether each of the plurality of generated failure repair sequences has acceptable performance or unacceptable performance based at least upon an analysis of the determined performance of the respective generated failure repair sequence and the upper-bound threshold and the lower-bound threshold;
record in the memory device system at least one or more changes at least in response to the determining of one or more of the generated failure repair sequences as having unacceptable performance.

3. The failure repair sequence generation system of claim 1, wherein the data processing device system is configured by the program at least to generate at least a portion of the failure repair sequence at least by:
(i) preliminarily generating a first sequence based at least upon repeatedly performing (b), the first sequence including a sequence of groups of nodes indicating an order in which the groups of nodes are to be repaired, and
(ii) generating an intra-group sequence for each of the plurality of groups of root nodes based at least upon repeatedly performing (a), each intra-group sequence being a sequence of root nodes indicating an order in which the root nodes in each respective group are to be repaired,
wherein the failure repair sequence represents at least the sequence of groups of root nodes of the first sequence with each group having its respective intra-group sequence of root nodes.

4. The failure repair sequence generation system of claim 1, wherein the data processing device system is configured by the program at least to generate at least a portion of the failure repair sequence at least by:
(i) identifying, based at least upon performance of (a)(1), at least two root nodes having a same greatest number of leaf nodes of the subset of the plurality of leaf nodes indicated as experiencing failure or indicated prior to experiencing failure as compared to at least some other root nodes of the subset of the plurality of root nodes besides the at least two root nodes, the at least two root nodes forming a group of root nodes, and (ii) generating an intra-group sequence for the group of root nodes based at least upon performing (b), the intra-group sequence being a sequence of the at least two root nodes indicating an order in which the at least two root nodes are to be repaired, wherein the failure repair sequence represents at least the intra-group sequence.

5. The failure repair sequence generation system of claim 1, wherein the memory device system stores repair resource information indicating at least resources available for node repair, and wherein the data processing device system is further configured by the program at least to:

receive an indication of acceptable repair performance; and generate the failure repair sequence to meet the acceptable repair performance while minimizing use of the resources available for node repair.

6. A failure repair sequence generation system comprising:

a data processing device system;

a memory device system communicatively connected to the data processing device system and storing a program executable by the data processing device system, the memory device system storing network information indicating at least a network topology comprising a plurality of nodes, the plurality of nodes comprising a plurality of root nodes and a plurality of leaf nodes, each leaf node connected directly or indirectly to at least one root node of the plurality of root nodes, a subset of the plurality of root nodes indicated by the network information as experiencing failure or indicated by the network information prior to experiencing failure, a subset of the plurality of leaf nodes indicated by the network information as experiencing failure or indicated by the network information prior to experiencing failure, and the program comprising:

acquisition instructions configured to cause acquisition, from the memory device system, of the network information;

generation instructions configured to cause generation of a failure repair sequence based at least upon an analysis of at least a portion of the network information, the failure repair sequence indicating a sequence of node sets in which the node sets are to be repaired, each node set comprising a node of the plurality of nodes, and the analysis comprising:

(a)

(1) identifying a damage-priority-repair root node of the subset of the plurality of root nodes, which is also a subset of the plurality of nodes, indicated as experiencing failure that has a greatest number of leaf nodes of the subset of the plurality of leaf nodes indicated as experiencing failure as compared to at least some other root nodes of the subset of the plurality of root nodes besides the damage-priority-repair root node, (2) assigning the identified damage-priority-repair root node a damage-priority-repair position in the sequence of node sets as compared to the at least some other root nodes of the subset of the plurality of root nodes besides the damage-priority-repair root node, the damage-priority-repair position being a position in the sequence of node sets that indicates that the identified damage-priority-repair root node is to be repaired with a higher priority than the at least some other root nodes of the subset of the plurality of root nodes besides the damage-priority-repair root node, and (b)

(1) identifying a preventability-priority-repair root node of the subset of the plurality of root nodes indicated as experiencing failure or prior to experiencing failure that has a connected leaf node of the plurality of leaf nodes that (i) is not indicated as experiencing failure and (ii) is connected to a fewest number of root nodes as compared to at least some other leaf nodes of the plurality of leaf nodes not indicated as experiencing failure or prior to experiencing failure, (2) assigning the identified preventability-priority-repair root node a preventability-priority-repair position in the sequence of node sets as compared to at least some other root nodes of the subset of the plurality of root nodes besides the preventability-priority-repair root node, the preventability-priority-repair position being a position in the sequence of node sets that indicates that the identified preventability-priority-repair root node is to be repaired with a higher priority than the at least some other root nodes of the subset of the plurality of root nodes besides the preventability-priority-repair root node;

and storage instructions configured to cause storage of the generated failure repair sequence in the memory device system.

7. A failure repair sequence generation method executed by a data processing device system according to a program stored by a memory device system communicatively connected to the data processing device system, the memory device system further storing network information indicating at least a network topology comprising a plurality of nodes, the plurality of nodes comprising a plurality of root nodes and a plurality of leaf nodes, each leaf node connected directly or indirectly to at least one root node of the plurality of root nodes, a subset of the plurality of root nodes indicated by the network information as experiencing failure or indicated by the network information prior to experiencing failure, a subset of the plurality of leaf nodes indicated by the network information as experiencing failure or indicated by the network information prior to experiencing failure, and the method comprising the steps of:

acquiring, from the memory device system, the network information;

generating a failure repair sequence based at least upon an analysis of at least a portion of the network information, the failure repair sequence indicating a sequence of node sets in which the node sets are to be repaired, each node set comprising a node of the plurality of nodes, and the analysis comprising:

(a)

(1) identifying a damage-priority-repair root node of the subset of the plurality of root nodes, which is also a subset of the plurality of nodes, indicated as experiencing failure that has a greatest number of leaf nodes of the subset of the plurality of leaf nodes indicated as experiencing failure as compared to at least some other root nodes of the subset of the plurality of root nodes besides the damage-priority-repair root node, (2) assigning the identified damage-priority-repair root node a damage-priority-repair position in the sequence of node sets as compared to the at least some other root nodes of the subset of the plurality of root nodes besides the damage-priority-repair root node, the damage-priority-repair position being a position in the sequence of node sets that indicates that the identified damage-priority-repair root node is to be repaired with a higher priority than the at least some other root nodes of the subset of the plurality of root nodes besides the damage-priority-repair root node, and (b)

(1) identifying a preventability-priority-repair root node of the subset of the plurality of root nodes indicated as experiencing failure or prior to experiencing failure that has a connected leaf node of the plurality of leaf nodes that (i) is not indicated as experiencing failure and (ii) is connected to a fewest number of root nodes as compared to at least some other leaf nodes of the plurality of leaf nodes not indicated as experiencing failure or prior to experiencing failure, (2) assigning the identified preventability-priority-repair root node a preventability-priority-repair position in the sequence of node sets as compared to at least some other root nodes of the subset of the plurality of root nodes besides the preventability-priority-repair root node, the preventability-priority-repair position being a position in the sequence of node sets that indicates that the identified preventability-priority-repair root node is to be repaired with a higher priority than the at least some other root nodes of the subset of the plurality of root nodes besides the preventability-priority-repair root node;

and storing the generated failure repair sequence in the memory device system.

8. A non-transitory computer-readable storage medium system comprising one or more non-transitory computer-readable storage mediums storing a program executable by one or more data processing devices of a data processing device system, the program comprising:

an acquisition module configured to cause acquisition, from a memory device system, of network information indicating at least a network topology comprising a plurality of nodes, the plurality of nodes comprising a plurality of root nodes and a plurality of leaf nodes, each leaf node connected directly or indirectly to at least one root node of the plurality of root nodes, a subset of the plurality of root nodes indicated by the network information as experiencing failure or indicated by the network information prior to experiencing experience failure, and a subset of the plurality of leaf nodes indicated by the network information as experiencing failure or indicated by the network information prior to experiencing experience failure;

a generation module configured to cause generation of a failure repair sequence based at least upon an analysis of at least a portion of the network information, the failure repair sequence indicating a sequence of node sets in which the node sets are to be repaired, each node set comprising a node of the plurality of nodes, and the analysis comprising:

(a)

(1) identifying a damage-priority-repair root node of the subset of the plurality of root nodes, which is also a subset of the plurality of nodes, indicated as experiencing failure that has a greatest number of leaf nodes of the subset of the plurality of leaf nodes indicated as experiencing failure as compared to at least some other root nodes of the subset of the plurality of root nodes besides the damage-priority-repair root node, (2) assigning the identified damage-priority-repair root node a damage-priority-repair position in the sequence of node sets as compared to the at least some other root nodes of the subset of the plurality of root nodes besides the damage-priority-repair root node, the damage-priority-repair position being a position in the sequence of node sets that indicates that the identified damage-priority-repair root node is to be repaired with a higher priority than the at least some other root nodes of the subset of the plurality of root nodes besides the damage-priority-repair root node, and (b)

(1) identifying a preventability-priority-repair root node of the subset of the plurality of root nodes indicated as experiencing failure or prior to experiencing failure that has a connected leaf node of the plurality of leaf nodes that (i) is not indicated as experiencing failure and (ii) is connected to a fewest number of root nodes as compared to at least some other leaf nodes of the plurality of leaf nodes not indicated as experiencing failure or prior to experiencing failure, (2) assigning the identified preventability-priority-repair root node a preventability-priority-repair position in the sequence of node sets as compared to at least some other root nodes of the subset of the plurality of root nodes besides the preventability-priority-repair root node, the preventability-priority-repair position being a position in the sequence of node sets that indicates that the identified preventability-priority-repair root node is to be repaired with a higher priority than the at least some other root nodes of the subset of the plurality of root nodes besides the preventability-priority-repair root node;

and a storage module configured to cause storage of the generated failure repair sequence in the memory device system.

* * * * *

UNITED STATES PATENT AND TRADEMARK OFFICE
CERTIFICATE OF CORRECTION

| | | |
|---|---|---|
| PATENT NO. | : 9,166,907 B2 | Page 1 of 1 |
| APPLICATION NO. | : 14/157193 | |
| DATED | : October 20, 2015 | |
| INVENTOR(S) | : Shimon Y. Nof et al. | |

It is certified that error appears in the above-identified patent and that said Letters Patent is hereby corrected as shown below:

Title page

Item (56), References Cited, OTHER PUBLICATIONS, the web address for the reference beginning "FICO, 2011" is missing a "." before "aspx", such that "www.fico.com/en/Products/DMApps/Pages/FICO-Insurance-Fraud-Manageraspx" should read as --www.fico.com/en/Products/DMApps/Pages/FICO-Insurance-Fraud-Manager.aspx--.

In the Claims

Claim 8, at column 31, line 43, "information prior to experiencing experience failure" should read as --information prior to experiencing failure--.

Signed and Sealed this
First Day of March, 2016

Michelle K. Lee
*Director of the United States Patent and Trademark Office*